United States Patent
Gardiner et al.

(10) Patent No.: US 10,538,959 B2
(45) Date of Patent: Jan. 21, 2020

(54) WINDOW LOUVER CONTROL SYSTEM

(71) Applicant: SerraLux Inc., Los Gatos, CA (US)

(72) Inventors: Mark E Gardiner, Santa Rosa, CA (US); David Allen Lockett, Los Gatos, CA (US); Robert Somers Ford, Los Gatos, CA (US)

(73) Assignee: SERRALUX INC., Los Gatos, CA (US)

( * ) Notice: Subject to any disclaimer, the term of this patent is extended or adjusted under 35 U.S.C. 154(b) by 0 days.

(21) Appl. No.: 14/850,762

(22) Filed: Sep. 10, 2015

(65) Prior Publication Data

US 2016/0186488 A1 Jun. 30, 2016

Related U.S. Application Data

(60) Provisional application No. 62/050,018, filed on Sep. 12, 2014, provisional application No. 62/049,941,
(Continued)

(51) Int. Cl.
*E06B 9/264* (2006.01)
*F21S 11/00* (2006.01)
(Continued)

(52) U.S. Cl.
CPC ............. *E06B 9/264* (2013.01); *E06B 9/322* (2013.01); *F21S 11/00* (2013.01); *F21S 11/007* (2013.01);
(Continued)

(58) Field of Classification Search
CPC .. E06B 9/322; E06B 9/264; E06B 2009/2417; F21V 7/0083; F21S 11/007; F21S 11/005
(Continued)

(56) References Cited

U.S. PATENT DOCUMENTS

| 1,821,744 A | * | 9/1931 | Drummond ............ E06B 7/084 |
| | | | 454/277 |
| 3,031,151 A | | 4/1962 | McIvaine |
| | | | (Continued) |

FOREIGN PATENT DOCUMENTS

| JP | 5-52076 | * | 3/1991 |
| JP | 5-52076 A | | 3/1991 |
| | (Continued) | | |

OTHER PUBLICATIONS

PCT International Search report and written opinion of patentability in PCT/US2015/045674.

*Primary Examiner* — Gregory J Strimbu
(74) *Attorney, Agent, or Firm* — Edward S. Sherman

(57) ABSTRACT

An automated ganged louver assembly is adjusted in orientation by an actuator in the louver header that suspends or supports the louver rotation mechanism. The actuator is energized in response to a determination of solar elevation, which is optionally from a light sensor output via a controller. The light sensor employs an optical element to detect at least one of the sun elevation and azimuth, as well as general exterior light levels. The solar elevation and azimuth can also be determined by calculations from the window orientation and latitude. The optical elements and the controller are coupled to at least one of the louvers or the louver header to provide a self contained system that does not require exterior power or controls, unless desired.

17 Claims, 15 Drawing Sheets

Related U.S. Application Data filed on Sep. 12, 2014, provisional application No. 62/164,834, filed on May 21, 2015.

(51) Int. Cl.
| | | |
|---|---|---|
| *E06B 9/322* | (2006.01) | |
| *F21V 7/00* | (2006.01) | |
| *F21V 7/04* | (2006.01) | |
| *E06B 9/24* | (2006.01) | |

(52) U.S. Cl.
CPC .............. *F21V 7/0091* (2013.01); *F21V 7/04* (2013.01); *E06B 2009/2417* (2013.01); *Y02B 80/50* (2013.01)

(58) Field of Classification Search
USPC .......................................................... 49/74.1
See application file for complete search history.

(56) References Cited

U.S. PATENT DOCUMENTS

| | | | | |
|---|---|---|---|---|
| 3,741,102 | A | * | 6/1973 | Kaiser .................. A01K 1/0064 454/319 |
| 4,226,051 | A | | 10/1980 | Thompson |
| 4,509,825 | A | | 4/1985 | Otto et al. |
| 4,527,548 | A | * | 7/1985 | Gustafson ............. F24S 10/753 126/607 |
| 4,557,565 | A | * | 12/1985 | Ruck ........................ F21S 11/00 359/595 |
| 4,620,771 | A | * | 11/1986 | Dominguez ............. F21S 11/00 126/573 |
| 4,773,733 | A | | 9/1988 | Murphy |
| 4,883,340 | A | | 11/1989 | Dominguez |
| 4,989,952 | A | | 2/1991 | Edmonds |
| 5,121,785 | A | * | 6/1992 | Ohsumi .................. B32B 21/04 160/236 |
| 5,142,133 | A | | 8/1992 | Kern et al. |
| 5,461,496 | A | | 10/1995 | Kanada et al. |
| 5,663,621 | A | * | 9/1997 | Popat ..................... G05D 25/02 160/166.1 |
| 5,731,900 | A | | 3/1998 | Milner |
| 5,880,886 | A | | 3/1999 | Milner |
| 5,999,323 | A | | 12/1999 | Wood |
| 6,145,251 | A | * | 11/2000 | Ricci ....................... E06B 7/096 49/74.1 |
| 6,435,683 | B1 | | 8/2002 | Milner |
| 6,616,285 | B2 | | 9/2003 | Milner |
| 6,980,728 | B2 | | 12/2005 | Ladstätter et al. |
| 7,353,636 | B1 | * | 4/2008 | Anderson ............... E06B 7/086 49/74.1 |
| 7,389,609 | B2 | | 6/2008 | Yorgason |
| 7,742,230 | B2 | | 6/2010 | Uchida et al. |
| 8,281,518 | B2 | * | 10/2012 | Marocco .................. E06B 7/096 49/403 |
| 8,336,256 | B2 | * | 12/2012 | Jeffrey .................... E06B 7/096 454/221 |
| 8,365,800 | B2 | | 2/2013 | Oh et al. |
| 8,520,305 | B2 | | 8/2013 | Suzuki et al. |
| 8,522,478 | B1 | * | 9/2013 | Blachley ................. E06B 7/09 49/74.1 |
| 8,873,146 | B2 | | 10/2014 | Gardiner |
| 9,291,371 | B1 | * | 3/2016 | Lauder ................... F24J 2/5417 |
| 9,341,334 | B2 | | 5/2016 | Fujioka |
| 2003/0127197 | A1 | | 7/2003 | Lai |
| 2004/0253456 | A1 | | 12/2004 | Braybrook |
| 2005/0056382 | A1 | | 3/2005 | Khajavi |
| 2008/0202703 | A1 | | 8/2008 | Edmonds |
| 2008/0271378 | A1 | | 11/2008 | Le et al. |
| 2009/0009870 | A1 | | 1/2009 | Usami |
| 2011/0043919 | A1 | | 2/2011 | Ko |
| 2011/0067824 | A1 | * | 3/2011 | Konstantin ........... E04D 13/033 160/176.1 R |
| 2012/0033302 | A1 | | 2/2012 | Suzuki et al. |
| 2012/0168070 | A1 | | 7/2012 | Nelson et al. |
| 2013/0042982 | A1 | | 2/2013 | Zhang |
| 2013/0087294 | A1 | | 4/2013 | Khajavi |
| 2013/0265642 | A1 | | 10/2013 | Vasylyev |
| 2013/0306254 | A1 | | 11/2013 | Cheou et al. |
| 2014/0049983 | A1 | | 2/2014 | Nichol et al. |
| 2014/0055859 | A1 | | 2/2014 | Vasylyev |
| 2014/0104689 | A1 | | 4/2014 | Padiyath et al. |
| 2014/0211331 | A1 | | 7/2014 | Padiyath et al. |
| 2015/0226394 | A1 | | 8/2015 | Ueki |
| 2016/0178164 | A1 | | 6/2016 | Nishida |
| 2016/0186949 | A1 | | 6/2016 | Sekido et al. |
| 2017/0234064 | A1 | * | 8/2017 | Dupielet .................. E06B 9/322 |

FOREIGN PATENT DOCUMENTS

| | | |
|---|---|---|
| TW | M437888 U | 9/2012 |
| TW | M449854 U | 4/2013 |
| WO | 1997031276 A1 | 8/1997 |
| WO | 2014078812 A1 | 5/2014 |
| WO | WO 2014/078812 * | 5/2014 |

\* cited by examiner

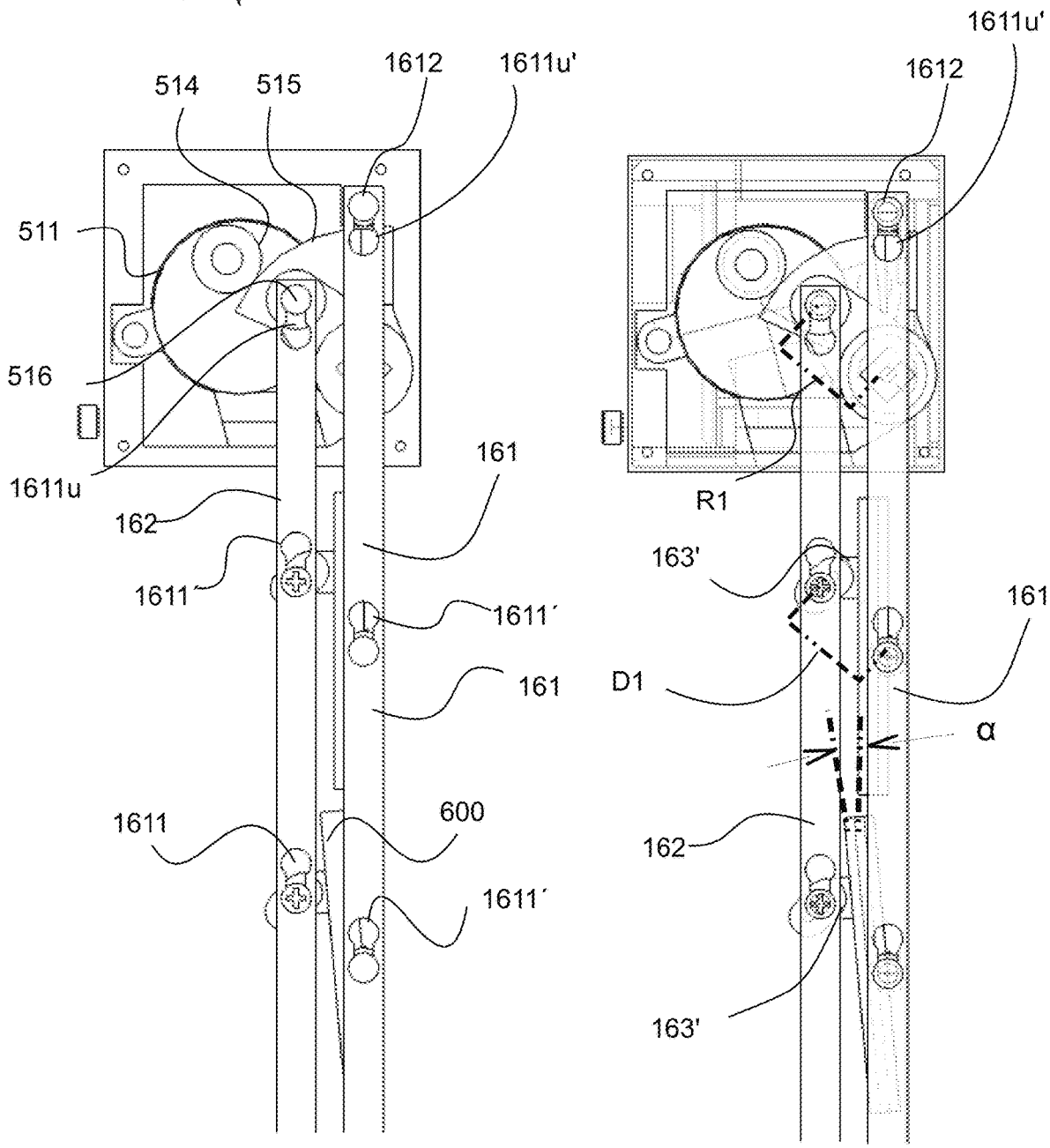

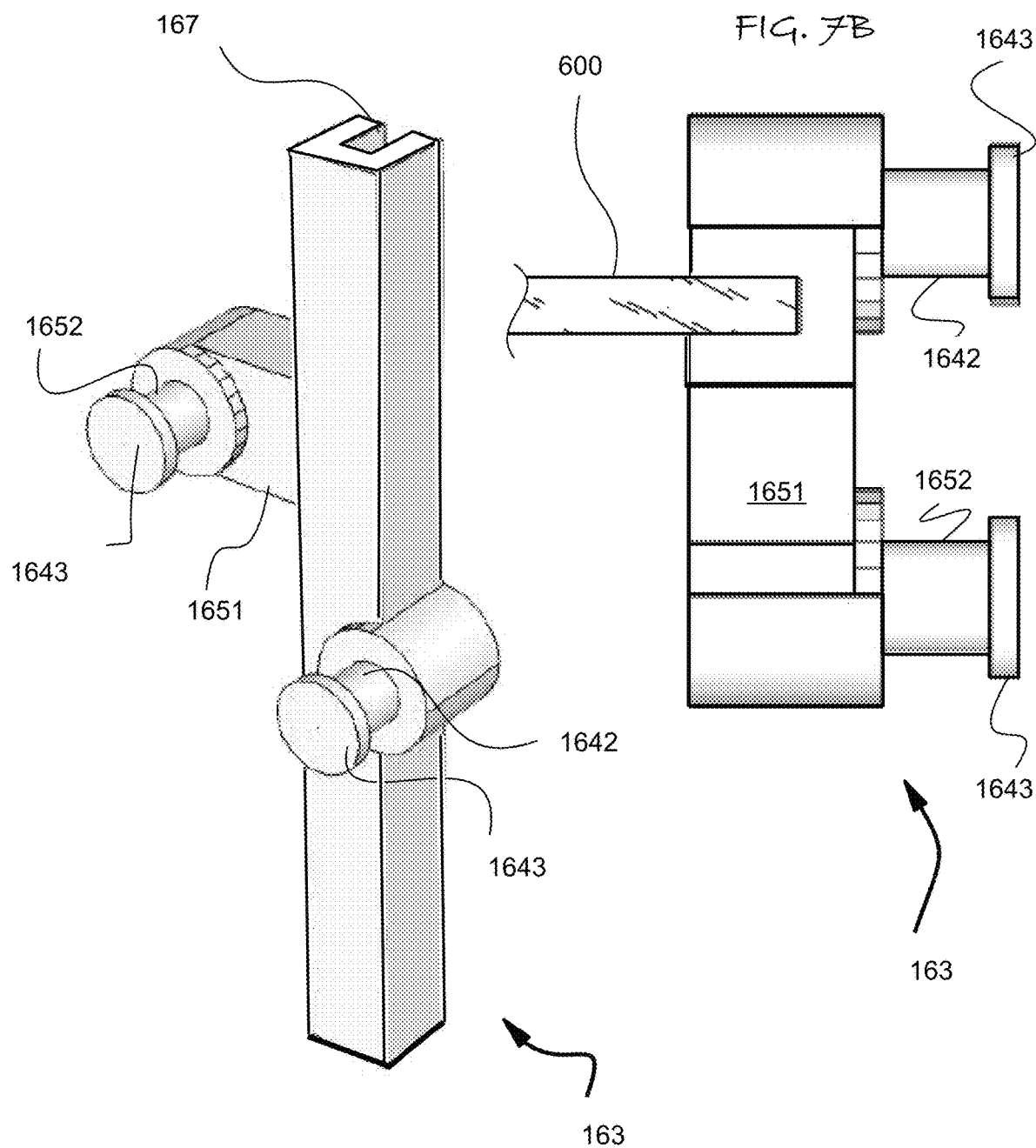

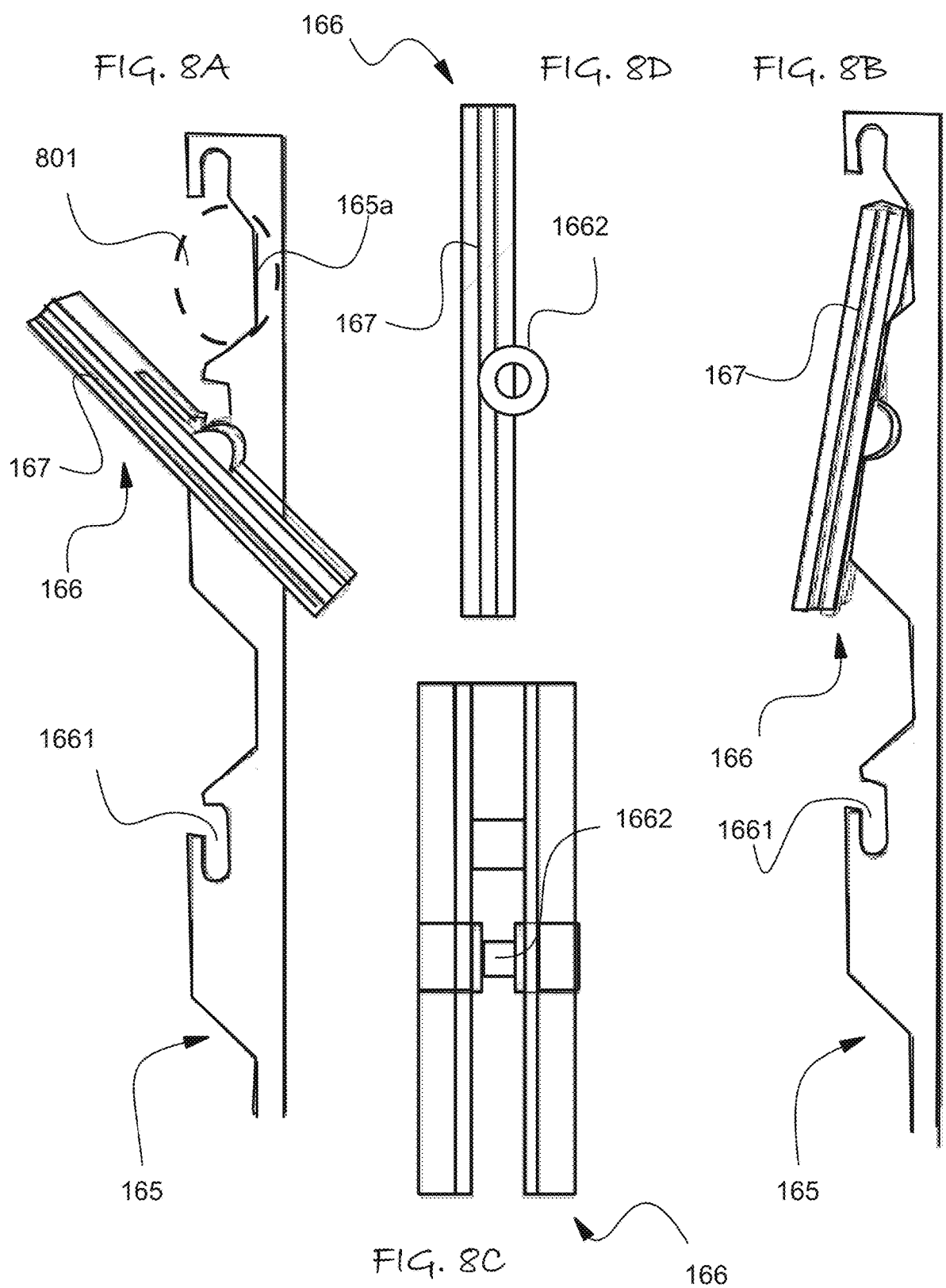

WINDOW LOUVER CONTROL SYSTEM

CROSS REFERENCE TO RELATED APPLICATIONS

The present application claims the benefit of priority to the US Provisional patent application of the same title that was filed on Sep. 12, 2014, having application No. 62/050,018, as well as the following applications: Appl. Ser. No. 62/049,941 (filed Sep. 12, 2014) and Appl. No. 62/164,834 (filed May 21, 2015), all of which are incorporated herein by reference.

BACKGROUND OF INVENTION

The field of inventions is window covering, and more particularly louver assemblies for covering windows and related glazing or fenestration.

Louver assemblies are intended to rotate the louvers in parallel to either admit light or block light to limit visibility from either the interior or the exterior, i.e. to provide privacy. It is desirable to block light when it would be annoying to occupants, or heat the room when not desired.

However, blind assemblies are usually manually rotated, and rely on the cognizance of the occupants to determine and act when it would be desirable to make an adjustment.

U.S. Pat. No. 4,773,733 (Murphy et al., Sep. 27, 1988) discloses a louver assembly with an automated means to rotate the louvers to exclude direct sunlight, with the louvers elements deploying a prismatic structure to reflect light back to the outside of the window by total internal reflection. Such louvers would distort the outside image, so external visibility is achieved by the spaces between the louvers. Hence, the louvers are intended to operate in the largely horizontal orientation and only rotate to catch and reflect direct sunlight back outward. In other words, with respect to sunlight, they act like metallic reflectors, but let diffuse external light (that is non-direct sunlight emanating from objects) enter the room. However, such diffuse light is broken up by the prismatic structures which distorts the external appearance to the room occupants. The louvers are adjusted from the largely horizontal orientation by a motor drive in response to the detection of the suns altitude, which is done by a photo-detector placed on a louver proximal to a louver supporting header element.

While it is desirable to reflect direct sunlight that would annoy building residents outward, it is more desirable to redirect this sunlight inward, but upward toward the ceiling in the building to minimize the need for interior lighting during the daytime.

It would be an advance to provide an improved means to adjust louvers for light re-direction, as well as better control privacy and the utilization or exclusion of the sun or other exterior lighting sources.

The above and other objects, effects, features, and advantages of the present invention will become more apparent from the following description of the embodiments thereof taken in conjunction with the accompanying drawings

SUMMARY OF INVENTION

In the present invention, the first object is achieved by providing louver assembly, comprising a tiltable or rotatable array of generally parallel louvers, a means to determine the sun direction, an actuator means, a header for supporting the louver arrays that includes the actuator means to tilt the generally parallel louvers, wherein the actuator means is operative to tilt the louvers from a negative tilt angle to a vertical, and from vertical to a positive tilt angle in which the total rotation is the sum of the absolute values of the positive and negative tilt.

Another aspect of the invention is the louver assembly wherein the louvers are for light re-directing and are rotated to re-direct sunlight into an interior space Another aspect of the invention is any such louver assembly wherein the louvers have see through visibility when viewed at the surface normal direction.

Another aspect of the invention is any such louver assembly comprising one or more photovoltaic cells to power the actuator means.

Another aspect of the invention is any such louver assembly wherein each louver is supported fixed in space proximal to a center and the actuator means is operative to rotate the louvers about the fixed supported position by a vertically moving positioning bar.

Another aspect of the invention is any such louver assembly wherein each louver is supported at the opposing ends by support clips that engages: a vertically suspended and fixed support bar, a positioning bar disposed behind the support, wherein the positioning bar engages different portion of the louver than the fixed support bar so the mass of the louvers in the array is supported by the vertically suspended and fixed support bar and the vertical movement of the positioning bar rotates the louvers Another aspect of the invention is any such louver assembly wherein the actuator means deploys a wedge gear to raise and lower the positioning bar.

Another aspect of the invention is any such louver assembly wherein one or more of the louvers has a blackened edge.

Another aspect of the invention is any such louver assembly wherein one or more louvers in the array are disposed with a predetermined bias angle from a parallel orientation.

Another aspect of the invention is any such louver assembly wherein one or more louvers in the array are disposed with a predetermined bias angle that is set by a support clips that attached to opposing ends of the louvers.

A still further aspect of the invention is a method of deploying adjustable light re-directing louvers, the method comprising the steps of providing a louver assembly, comprising: tiltable or rotatable array of generally parallel louvers, a means to determine the sun direction, an actuator means, a header for supporting the louver arrays that includes the actuator means to tilt the generally parallel louvers, wherein the actuator means is operative to tilt the louvers and the additional steps of determining if the sunlight is direct or diffuse, adjusting the louver position in response to the determination of the second step, wherein said step of determining further comprises determining the solar elevation when the sunlight is direct.

Another aspect of the invention is such a method of deploying adjustable light re-directing louvers wherein the output of a photovoltaic cell is deployed in the second step.

A further aspect of the invention a method of deploying adjustable light re-directing louvers, the method comprising the steps of providing a louver assembly, comprising: a tiltable or rotatable array of generally parallel louvers, a means to determine the sun direction, an actuator means, a header for supporting the louver arrays that includes the actuator means to tilt the generally parallel louvers, wherein the actuator means is operative to tilt the louvers, determining the solar elevation, adjusting the louver position in response to the determination of the second step to modulate the position of light re-directed by the louvers toward an interior space of a building.

Another aspect of the invention is such any such method of deploying adjustable light re-directing louvers wherein the output of a photovoltaic cell is deployed in said second step.

Another aspect of the invention is such any such method of deploying adjustable light re-directing louvers wherein the actuator means is operative to tilt the louvers from a negative tilt angle to vertical, and from vertical to a positive tilt angle.

Another aspect of the invention is any such louver assembly wherein the actuator means further comprises a battery that stores energy from the photovoltaic cells and the louvers are not rotated when the battery charge is below a predetermined level to maintain sufficient energy therein to fully operate the louver assembly without a wired power source.

Another aspect of the invention is any such louver assembly wherein the means to determine the sun direction is a reflector disposed on an upper louver in the array wherein the upper louver is tilted to maintain an image of the solar disk on a detector array supported by the header.

Another aspect of the invention is any such louver assembly wherein the means to determine the sun direction is a calculation means that deploys at least the date, the time, and a louver array compass orientation and location.

Another aspect of the invention is any such louver assembly wherein a plurality of louvers and supported at the opposing ends by support clips and the array is assembled by connecting the support clips of the louvers in a stacked orientation.

Another aspect of the invention is any such louver assembly wherein at least one bar hanging from the header connects the support clips of the stacked louvers.

The above and other objects, effects, features, and advantages of the present invention will become more apparent from the following description of the embodiments thereof taken in conjunction with the accompanying drawings.

BRIEF DESCRIPTION OF DRAWINGS

FIG. 5A-5C are schematic perspective views of three alternative orientations of the louvers in the embodiment of FIG. 4 in which FIG. 5A illustrates positive tilt of the louvers of the array, FIG. 5C illustrates negative tilt thereof and FIG. 5B illustrate the louvers in a vertical orientation between positive and negative tilt.

FIG. 6A is an exterior side elevation of the drive means connected to louvers of FIGS. 4 to 5C, whereas FIG. 6B is a partially transparent view thereof FIG. 7A is a perspective view of an isolated louver supporting end clip and FIG. 7B is a top plan view thereof showing a portion of the attached louver.

FIG. 8A is a side perspective view of a louver span support clip attached to a span support hanger with rearward tilt, whereas FIG. 8B is a side perspective view thereof in which the clip has the opposing tilt. FIG. 8C is a front elevation view of the span support clip and FIG. 8D is a side elevation view thereof in the orientation to support a louver in the vertical orientation.

DETAILED DESCRIPTION

Figure 1A:
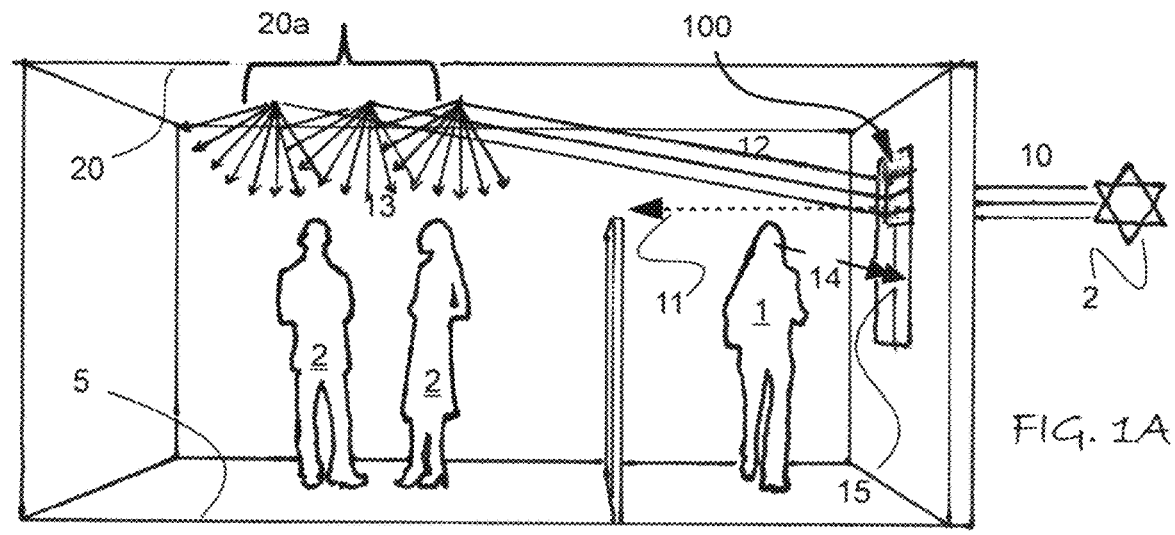
FIG. 1A-1C are diagrams of an installation of a preferred embodiment of the invention, with the sun at different elevation angles.

Referring to FIGS. 1A through 15, wherein like reference numerals refer to like components in the various views, there is illustrated therein a new and improved Window Louver Control System, generally denominated 100 herein.

In accordance with the present invention the Window Louver Control System 100 comprises a tilt or rotatable ganged louver assembly 110 supported by a header 120, including a means 130 to measure or determine the sun direction, which can be via computations or tables or via optical means 130 and a sensor means 140 in the header 120. The header 120 also houses an actuation means 500, with a drive means 510 disposed in the header 120 to tilt or rotate the louvers 600 in response to the determination of the sun direction, or detection of the lack of sun or diffuse lighting from a cloudy or foggy day, and the like. The actuation means 500 includes a controller 520, such as a microprocessor, a computer, a programmable logic controller (PLC) and the like, which modulate power to the drive means 510, such as a servo-controller, actuator or stepper motor 511 in response to a determined sun direction, which is optionally either by direct calculation or measurement.

Figure 1B:
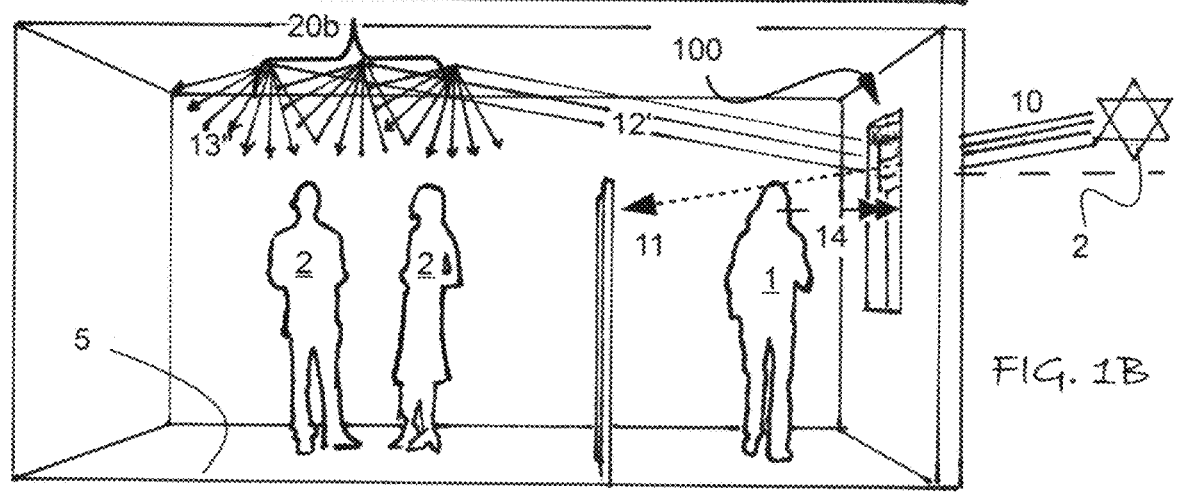
Figure 1C:
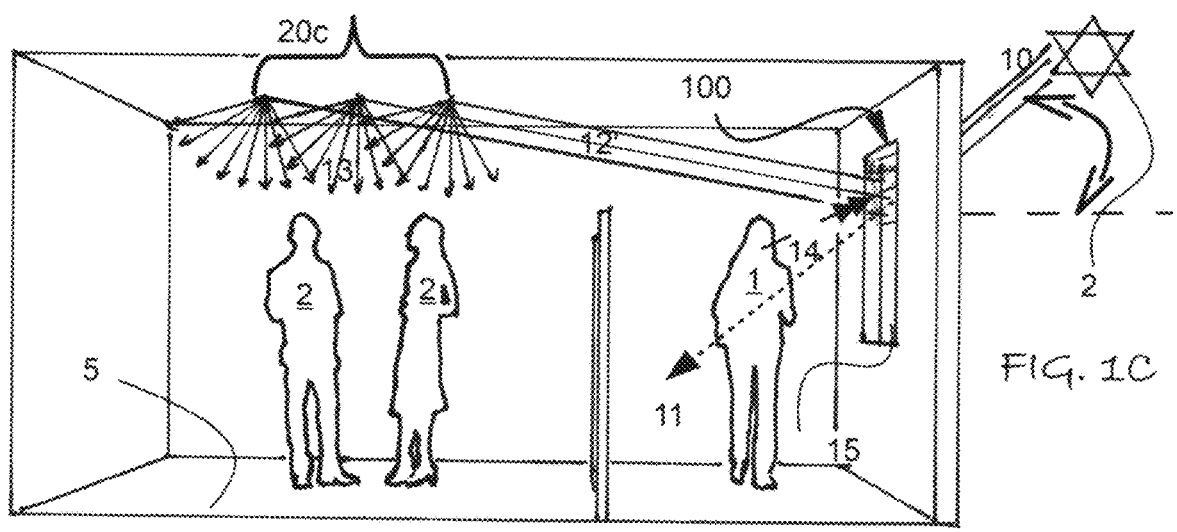

The ganged louver assembly 110 includes tiltable louvers or slats 600 in an array 160. The array 160 may comprise multiple louvers 600 in one or more vertically stacked columns. Hence, the array 160 can extend in width by the length of each louver 600 in the lateral or horizontal direction. Further, the louvers 600 can also be arrayed vertically in multiple laterally adjacent stacks to span different window widths. The louvers 600 in the array 160 are generally at or nearly parallel to each other, and are supported by a common support mechanism that allows for adjustment in tilt angle via the actuation means 500. These louvers 600 can be opaque, transparent, translucent and/or reflective, as well as any combination thereof. Preferably the louvers 600 have light re-directing properties to control the angle at which incident sunlight enters the building structure. In a mode of operation the louver 600 orientation essentially follows the sun 2 to re-direct light where is it desired, which is preferably toward the interior ceiling 20 so the sunlight will scatter therefrom (as rays 13) to illuminate a greater portion of the interior of the structure, as shown in FIG. 1A-1C. Preferred daylighting or light re-directing louvers 600 are generally flat and planar slats that deploy parallel reflective internal surfaces within a transparent matrix. When the louvers 600 are vertical as shown in FIG. 5B, the internal reflective surface are horizontal and the building occupants, looking at the array 160 in the direction of the window surface normal have optimum view outside the window or glazing 15. The see through visibility will always be most complete when the occupants are looking at the windows at the angle which is parallel to the face of the reflective internal surface. By most complete, we mean not interrupted by the lines of the internal reflective surface, which would be apparent if these internal reflective surfaces reflect light that would otherwise be visible.

The optimum direction for this see through visibility in FIG. 1A-1C is indicated by double headed arrow 14 which points from the eye level of occupants 1 to the window 15 in the direction normal to the louver 600 surface FIG. 1A-1C illustrate how alternative orientations of the louvers 600 re-direct light into a room when the sun position is tracked or calculated and the louvers 600 are appropriately rotated to optionally select the region of the ceiling 20a where the incident sunlight is re-directed.

Figure 5A:
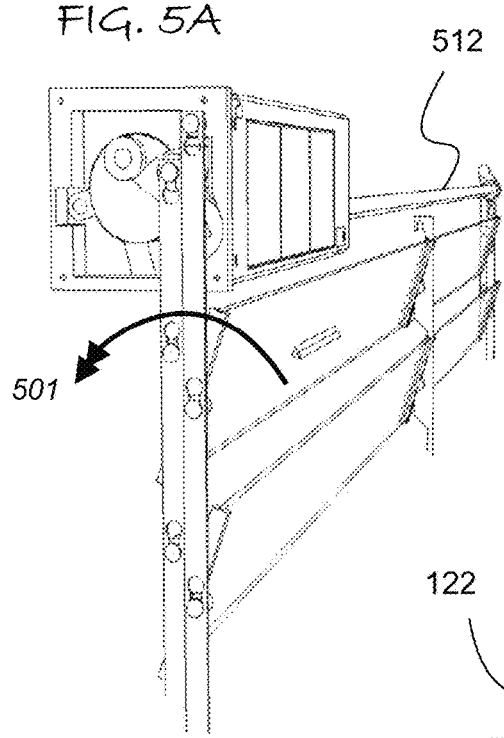

In FIG. 1A the sun 2 is at the horizon and it is desirable to negatively tilt the louvers 600 (as shown in FIG. 5A) so the sun light is re-directed as rays 12 to the ceiling region 20a rather than at the eyes of the occupants. As the sunlight is re-directed to the ceiling 20, it is scattered as rays 13 therefrom to more broadly illuminate the deeper portions of the room more distal from the window 15 from above and thus provide day lighting to occupants 2.

FIGS. 1B and 1C also illustrates the preferred use of a day light re-directing Window Louver Control System 100 to direct at least some portion of light rays 10 incident at progressively higher angles of the sun 2 on the window or glazing 15 away from the path 11 it would otherwise take in a room toward the floor 5, and re-direct it upward towards the ceiling 20 as ray 12', where it will be scattered off the ceiling 20 as rays 13. elevation, some rays 10' would also be re-directed, as rays 12', though deeper in the room, where it is scattered off the sealing as diffused natural light 13'

At these higher solar elevations of FIGS. 1B and 1C the louvers 600 are rotated from the negative to toward the vertical orientation (FIG. 5B) so the light reflecting surface optionally illuminate the same portion 20a of the ceiling 20. As the elevation of the sun is increased in FIG. 1C, the Alternatively, the louvers 600 can be rotated to an angle that provides for maximum efficiency of light use. The maximum efficiency is achieved at the louver rotation angle at which all the light incident on the surface of the window or glazing 15 is re-directed toward the ceiling. In contrast, fixing the range or angle of the light will allow some light rays to transmit directly through the louvers 600 and impinge on the floor as rays 11. This optimum angle also depends on, in addition to the time of day, and solar elevation, the aspect ratio of the louver light re-directing element as well as the sun azimuth, which varies with the windows orientation with respect to compass coordinates and latitude and longitude.

Figure 5C:
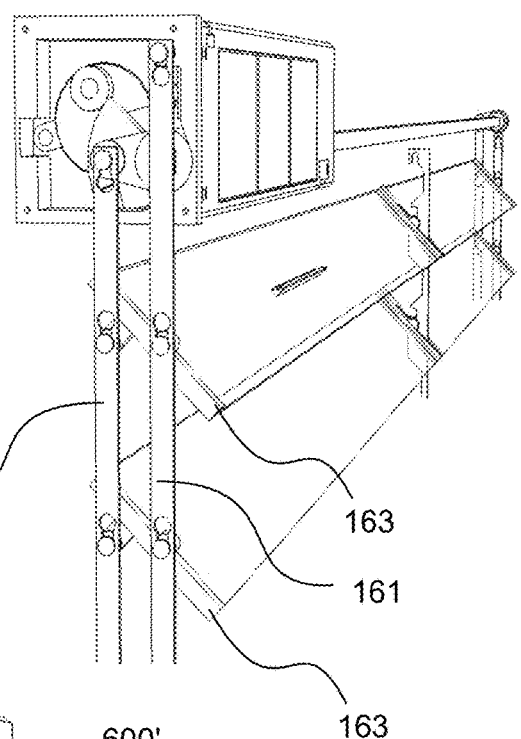
Figure 5B:
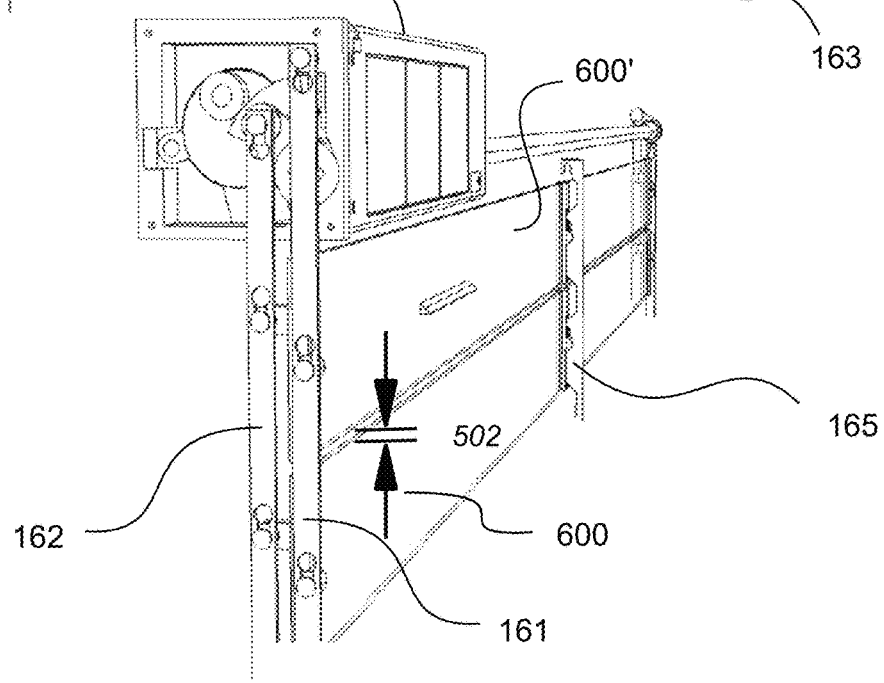
Figure 9:
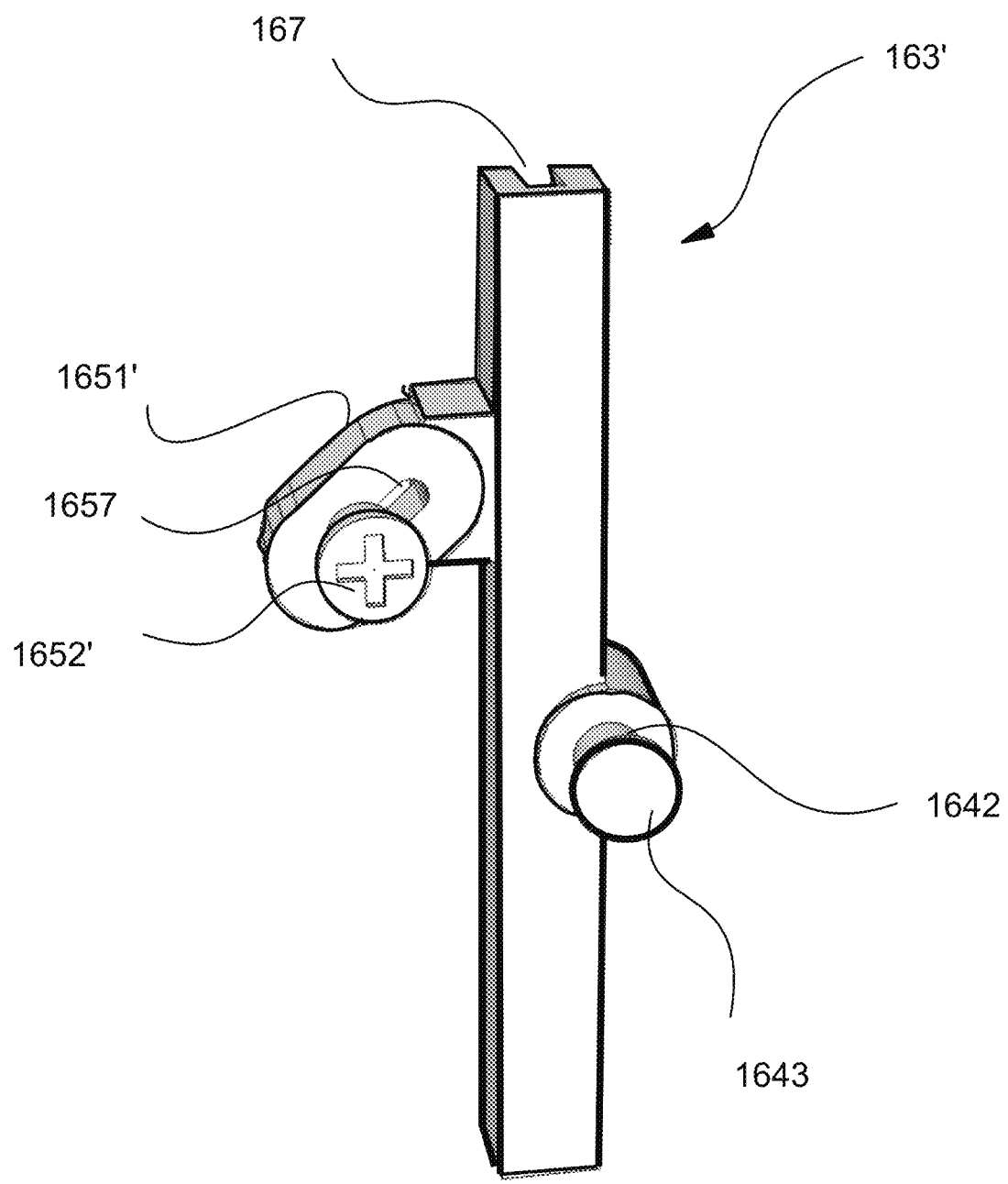
FIG. 9 is a perspective view of an alternative embodiment of the louver supporting end clip.

For example, the max efficiency angle for 2:1 aspect ratio of light directing structure is ~41.8 degrees, at "0" degrees azimuth angle, but would change to about 52 degrees from the louver surface normal at a 1.6:1 aspect ratio, FIG. 1C illustrates the sun at a still higher elevation, in which the louver 600 are tilted in a positive direction past the vertical orientation (as shown in FIG. 5C) to continue to re-direct light a portion of the ceiling 20, such as portion 20c, which is optionally the same as portions 20a and 20b in FIGS. 1A and 1B respectively. Occupant 1 has optimum visibility by looking upward in the direction of arrow 14.

The header 120 contains actuation means 500 or mechanism to rotate the louvers 600 in array 160 in response to the solar position or weather conditions, the header has a front edge that is positioned as close as possible to the interior glazing surface 15 within the window frame, or within a sealed glazing unit. Accordingly, it is preferable that the louver assembly 110 and louver rotation means are set back from the front face of the header 120, which is the portion closest to the window 15, so that the louvers 600 may be rotated to a fully horizontal orientation without hitting the window surface 15. Preferably, the louvers 600 are not wider than the header 120 depth.

It should be understood that while in many applications it would be preferable for an elongated header 120 to be disposed horizontally at the top of the window; it is also possible to dispose the header vertically at the side of a widow to rotate vertically running louvers.

In order to contain the entire louver assembly 110 and associated system 100 components, particularly the means for solar tracking, within the header 120 the solar elevation and azimuthal position can be measured via a sensor or sensor array 141 disposed within or otherwise coupled to the header 120 and optionally forward of the louver rotation drive means 510 so that one or more optical elements or means 135 attached to or integrated into a louver 600 can detect incident solar radiation, if any, by the differential output of sensors in the sensor array 141. This optical element 142 modulates the impingement of essentially collimated solar radiation onto a portion of the detector or detector array such that the solar elevation, and optionally the azimuth, can be determined from the differential output of the sensor(s) within the array, and optionally over a change of louver orientations.

Figure 14:
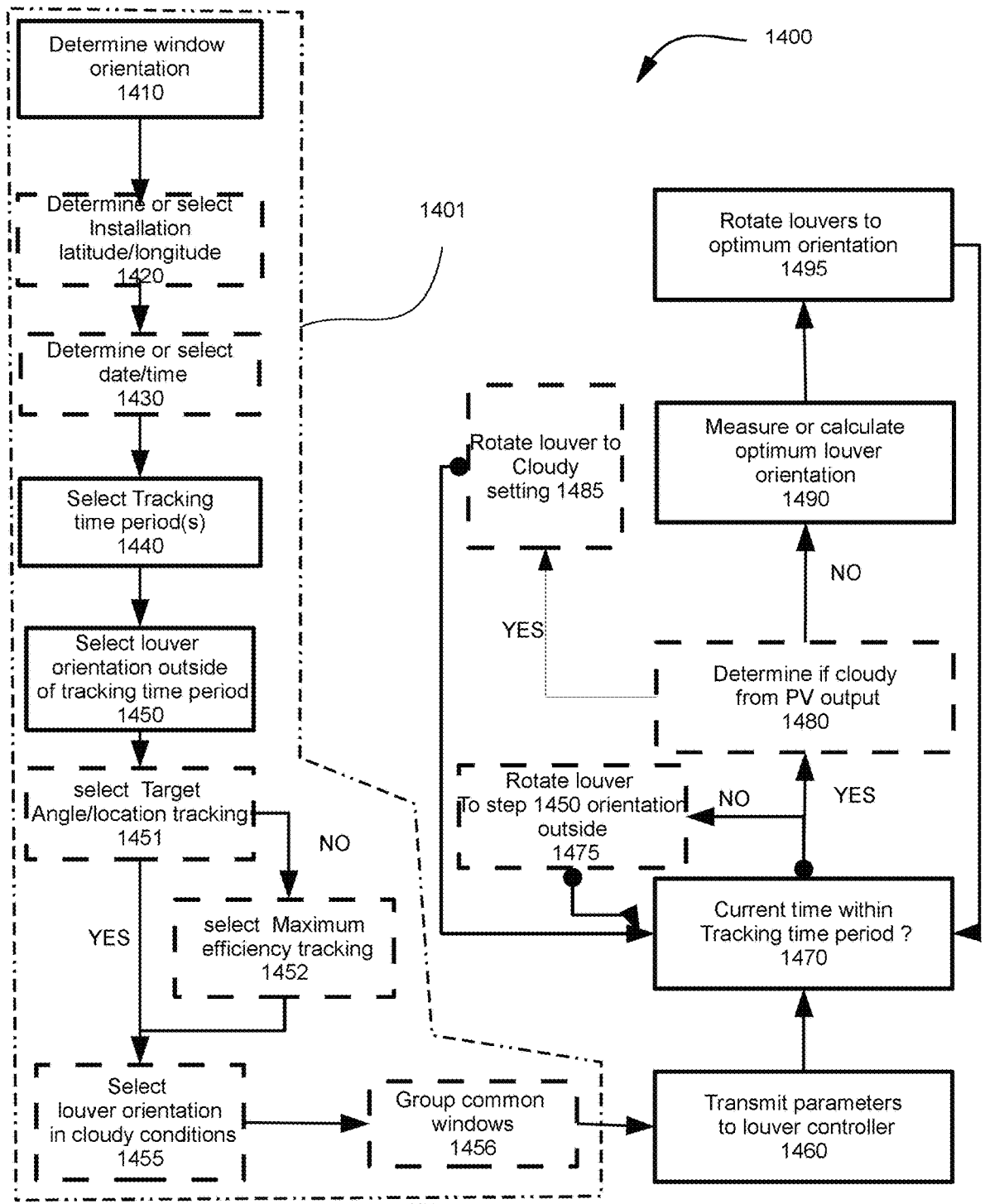
FIG. 14 is a flow chart illustrating alternative methods of using the louver assembly and system.

As the louvers 600 will be automatically rotated in the process 1400 of FIG. 14 in response to the solar elevation change, the orientation of the optical element 142 can optionally change, when affixed to a rotatable louver 600 to provide a different distribution of solar energy across the sensor array 141. The optical element can be selected so that the optimal louver rotation for sunlight redirection will provide essentially the same illumination pattern on the sensor array, or a time variant illumination pattern. This time variant pattern can then be used to determine an optimum louver orientation for sun light re-direction.

Figure 3:
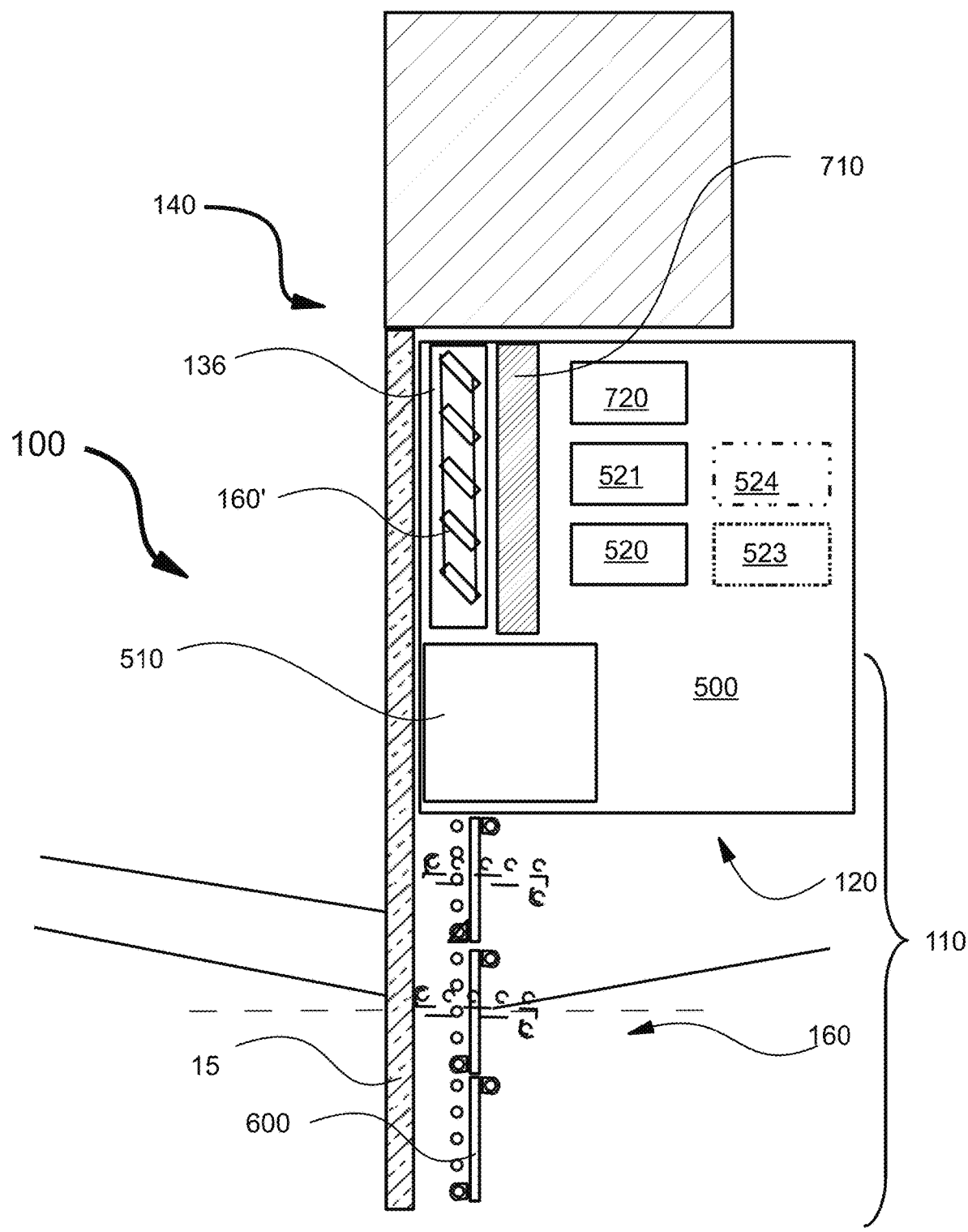
FIG. 3 is a cross-sectional elevation of an alternative embodiment deploying a light collimating louver in front of the photo voltaic (PV) cell as a solar detector.

Alternatively, the optical element 142 can be fixed, that is on a fixed louver, or on the header, so that the illumination pattern on the sensor arrays changes, but this temporal variation can then be used to calculate the desired orientation of at least some portion of the rotatable louvers so they can be continuously adjusted over a predetermined range. The louvers 600 can be deliberately rotated over a range to vary the detector output, and hence determine one or more of the solar elevation and azimuth angles. FIG. 3 illustrates such an embodiment in which the optical detection means 135 is a sub-set of louvers 160' can be rotated in front of a single PV cell 710 which acts as the detector means 140. The louvers in sub-set 160' are preferably opaque and have a high aspect ratio to be essentially collimating with respect to the face of the PV Cell 710 acting as a detector. Alternatively, the optical element 142 can be selected to provide any combination of temporal variation of the illumination pattern on the sensor array 141.

Accordingly, in the various embodiments described in further detail below, representative, but non exhaustive, examples of optical elements and sensor combinations will be provided which can be advantageous in different site and user specific applications.

Figure 4:
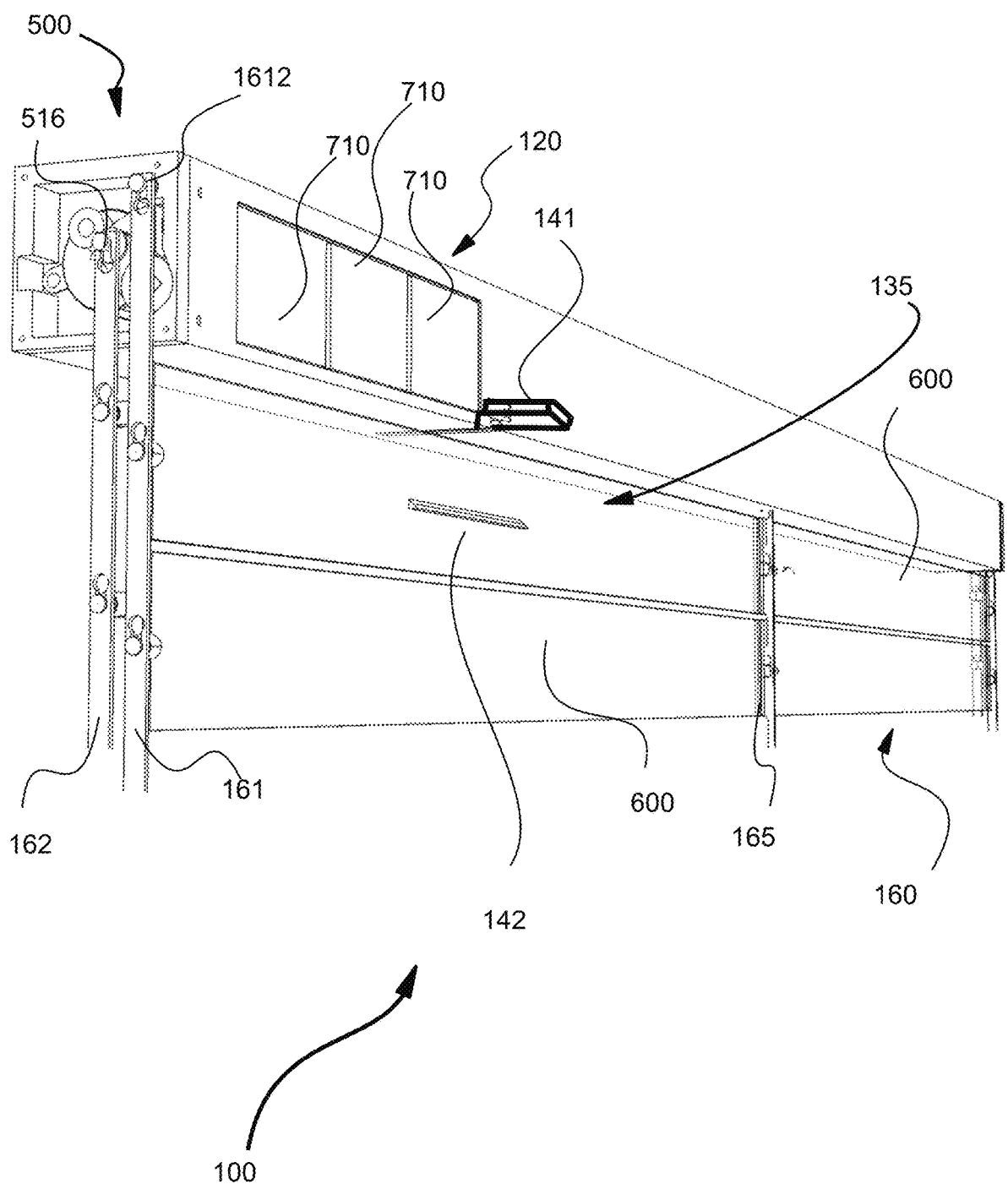
FIG. 4 is a schematic perspective view of a more preferred embodiment of the invention showing alternative opto-mechanical components to those generally illustrated in block diagrams in FIGS. 2 and 3.

The optical means 130 can be an optical element 142, such as a simple reflective mirror, as shown in FIG. 4, but may deploy one or more of following: plane mirror, right angle prism, curved reflectors and Fresnel reflectors, refractive and diffractive elements, including lenses, and collimators. Such a mirror or optical element 142 that, when "locked" in an orientation pointing to the sun's location, ideally results in the portion of light from the solar disk that is reflected by mirror or optical element 142 illuminating only the center detector in an array 141. The width of the mirror or optical element 142 is determined by the overall detector configuration (detector number, size and separation) as well as the optical geometry, such as: angular diameter of the sun, distance from tracking mirror to photo detectors. The length of the mirror depends on what azimuth or off normal angular range is desired for direct tracking. Since the distance between the tracking mirrors to the detectors increases as the azimuth angle increases, the width of the reflected light increases and also presents at an angle off the detector axis. In the case of a flat tracking mirror the range can be extended by providing a taper in the width of the mirror or optical element 142 as it extends toward its ends. Alternatively, the mirror or optical element 142 can become progressively more concave at the lateral ends, making the focal length equal to the distance from the mirror surface to the detectors.

Alternatively, a standard rectangular shaped mirror 142 can be deployed along with a linear array of finely spaced detectors 141. The detector array 141 need only have enough discrete detectors to accurately access the solar orientation from the differential output of adjacent detectors elements in the array 141. Accordingly, the optical element 142 is intended to image that portion of the solar disk projected by the mirror on a portion of the array that is less than about the size or width of 2 adjacent detector elements. The solar orientation can then be calculated by determining where the edges of the sunlight fall, allowing for spread across a varied number of detectors. This could also be accomplished using a two-dimensional CCD array, or other camera type imaging detector, and can optionally deploy a focusing light-pipe between where the sunlight falls and the CCD array, as CCD arrays are very small.

A narrow rectangular mirror 142 has been satisfactorily implemented with an array 141 of three detectors. The process of detection also involves dynamic monitoring of the light intensity as the louver 600' supporting the reflector 142 rotates by comparing the relative magnitude of the output of each detector in the array 141. Provided that the optical arrangement limits only two of the three sensors from being totally illuminated, then further adjustment of the tilt position until the center detector is maximized and the side detectors see similar intensity indicates the direction to tilt for optimum detection. It is preferable that the louvers continuously adjust to maximize the tracking accuracy. However, as it is preferable to conserve battery power by less frequent movement of the louvers, the tracking can be at discrete time intervals, or selected by the user in the process of set up 1401 in FIG. 14. Prediction of the sun position, based on the time between the last tracking measurement using the known site orientation of the window and the installation longitude and latitude along with time and date, can extend the time between the movement and tracking events in the process 1400.

The header 120 may also deploy one or more photovoltaic (PV) cells 710 that face the glazing 15 to provide power to the sensors 141, control system electronics 520-524 (FIG. 15) and power any motors 511 and/or servo-controller that modulate the louver array 160 orientation. Such PV cells 710 can also be deployed as detectors provided the optical elements cause a temporal variation in solar illumination during the day.

In the most preferred embodiment of the invention, the PV cells 710 generate sufficient energy to provide the entire energy needed to power the actuation means 500, such as a servo-controller, actuator or motor 511 as well as the controller or microprocessor 520 and related control electronics. As it is desired that the entire device 100 be self contained and not require a wired connection to an external power source, or periodic changes of batteries. The PV cell(s) 710 is intended to provide sufficient energy year round to power the system. However, as a self contained device preferably has a header 120 not higher than necessary to accommodate the drive means 510 there is a limited space for such PV cells 710. This limited space, and the high cost of PV cells demand an energy efficient drive system. As the PV cells 710 will inherently have a lower output on cloudy and overcast days, the output can be used as shown in FIG. 14 to select a pre-determined louver 600 orientation for such conditions. As the PV cells 710 would be providing a minimum recharging of the battery on cloudy days, it may be desired not to move the louvers or attempt solar tracking until the PV cells 710 provide a higher output and the battery recharges to a desired level. However, the device 100 can also be powered by wire connection and be under direct control by a wall switch to override an automated rotation of the louvers 600.

Accordingly, another aspect of the invention is a louver support and drive system which can be driven by small, low power consuming motors, which produce low torque to be operated year round by solar energy captured by the PV cells 710. The preferred drive means 510 illustrated herein and described in further detail below accomplishes these objectives.

FIG. 5A-C are schematic perspective views of three alternative orientations of the louvers in the embodiment of FIG. 4, in which FIG. 5A depicts negative tilt at about 20° from the vertical louver 600 position in FIG. 5B and FIG. 5C depicts a positive tilt of about 45°. It should be appreciated that the negative to positive tilt is achieved by the counter clockwise rotation of the top edge of each louver so the louvers 600 reach the vertical position (FIG. 5B) between these movements. Thus, the total rotation is the sum of the absolute values of the positive and negative tilt. Hence, in the case of the movement between FIG. 5C to FIG. 5A, the total rotation was 65°.

As the top edge of each louver 600 rotates counter clockwise (as shown by curved arrow 501 in FIG. 5A) to the zero or vertical position from the positive tilt of FIG. 5C the bottom edge of the each louver (in FIG. 5A louver 600') is spaced away from the top edge of the lower louver 600 in each stack by a small gap, 502 at the closest approach in the vertical orientation to minimize sun light leakage.

Deploying the negative tilt of FIG. 5A permits very low angle sunlight to be re-directed toward the ceiling, rather than being transmitted or leaked between the louvers directly at eye level to building occupants 1 and 2.

Figure 13:
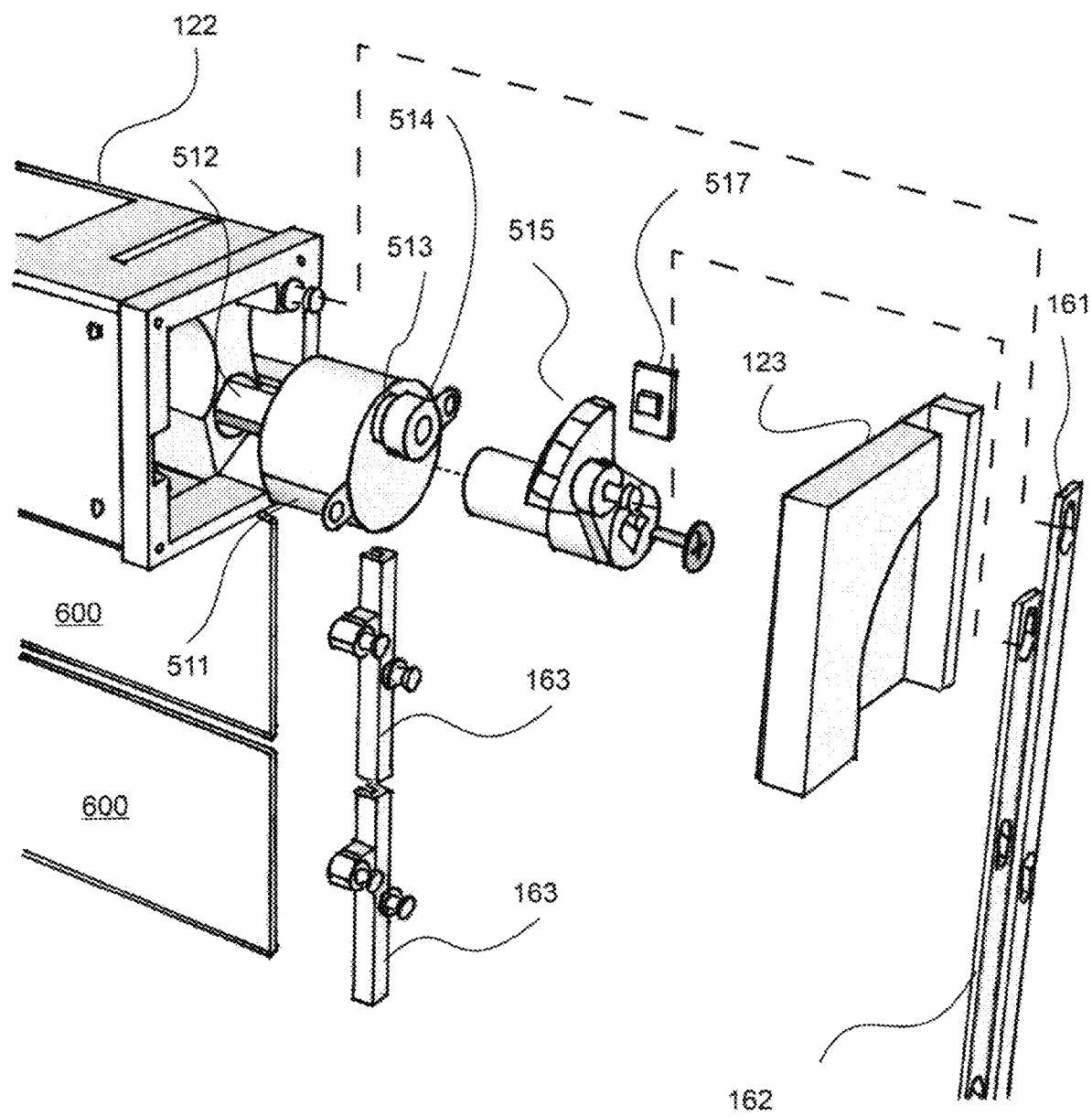
FIG. 13 is another exploded perspective view of the header module end to illustrate the connection of the drive means to the louver positioning support.

FIGS. 6A, 6B and 13 illustrate components of a preferred embodiment of the drive means 510, which includes motor 511. The motor 511 directly drives the rotation of the stepper spindle 513, which is connected to the wedge gear 515 by the drive gear 514. The wedge gear 515 is attached to one end of a common header shaft 512. The opposing end of the header 120 support the other end of the shaft 512, which also terminates in at least the portion of the wedge gear 515 that also has an extending position for a positioning bar support pin 516 shown on wedge gear 515 in these Figures.

As shown in FIG. 13, the wedge gear 515 is held in on the common header shaft 512 by an end screw The radius of the position arm of the wedge gear 515 (R1 in FIG. 6B) is equal to the distance (D1) between the support and position pins on the louver end clip. Further, a louver sensing switch 517, disposed in the header module 122, is tripped by the contact with wedge gear 515 reaching the position which corresponds to the louver array 160 reaching its most forward negative tilt angle, and allows controller 520 to determine an absolute reference tilt angle of louver array 160.

The rotation of the wedge gear 515 raises or lowers the vertical extending positioning bar 162 which is hanging from the support pin 516 via an upper keyhole shaped slot 1611$u$. It should be noted that the positioning bar 162 has additional keyhole shaped slots 1611 below the upper keyhole shaped slot 1611$u$. In contrast, the support bar 161 is fixed to the top of the header 120, being suspended at an upper keyhole slot 1611$u$' from a fixed pin 1612. It should be noted that the support bar 162 also has additional keyhole shaped slots 1611' below the upper keyhole shaped slot 1611$u$'. It should be understood that the positioning bar 162 is optionally substituted with a linear support member that can be moving vertically by the actuation means 500, such as a rope or cable, and the end clips 163 (FIGS. 7A and 7B) can be adapted so that the engaging positioning clip pin 1652 is replaced with another member for fixed engagement to such an alternative linear support member.

Each louver 600 is supported on the opposing ends by either an end clip 163 or a span support clip 166 (FIG. 8A-D). The end clips 163 and span support clips 166 have an edge slot or jaw portion 167 to receive and frictionally grasp the short edge of the louver 600. The opposing ends of the clips 163, 163' and 166 from the slot or jaws 167 position the extending pins or axles that engage the keyhole or other slots in the vertically hinging support bars. The support pins on the end clips 163, 163', 163" and 166 have a nails style head 1643 to prevent escape from the lower position of the keyhole slots 1611.

Each of the fixed support bar 161 and moving positioning bar 162 have a series of such keyhole slots 1611 disposed down the length. Each louver 600 is connected at opposing ends to both the support bar 161 and the position bar 162 via an end clip 163 (FIGS. 7A and 7B) or span support clip 166 (FIG. 8A-D), which have one or more pins or axles that freely rotate in the bottom of the keyhole slot in the vertically suspended bars.

In a preferred embodiment, the center of a central support pin 1642 or span support clip axle 1662 is in line with tracking mirror 142 surface, but centered between the front and rear edge of the louver 600. However, the pin 1642 is still offset from the louver center of mass to dispose the louver 600 in the horizontal position. In contrast, the center of the positioning pin 1652 is off set so that the louver 600 is at its most extreme negative angle when the support 161 and positioning 162 bars touch at the louver 600 orientation in FIG. 5A. The end clip 163 supports pin 1652 between the upper edge of the louver 600 and the center location of pin 1642 by an offsetting arm 1651. It should also be noted that to allow louver 600 to rotate clockwise, and clip positioning pins 1652 is extended away from clip body by arm 1651.

The pin 1642 to pin 1652 separation on clip arm 163 and 163' corresponds with the separation of the bottom of the associated key holes on the central support bar 161 and positioning bar hangers as they laterally separate with the rotation of the stepper 511.

Hence, the positioning bar 162 has a very small load, whereas the static support bar 161 carries most of the louver 600 load. As the load of the louvers 600 in the array 160 is carried by the fixed support bar 161, only a low power and torque is required to raise or lower the positioning bar 162 the small distance required to rotate the louvers 600 in the array 160. Also, the placement of the positioning clip arm and the pin distal from the center of gravity of the louver 600 decreases the torque required for louver 600 rotation.

The span support hanger 169 and span support clips 166 (FIG. 8A-D) allow the horizontal coupling of multiple horizontally adjacent louvers 600 to expand the width of the array 160 to the window width from standard louver 600 elements. The louvers 600 at the ends of such array(s) 160 are held at the outer edge by the end clips 163. An end of a louver 600 not at the edge of the array is connected to the span support hanger 169 by support clip 166. Thus, the span support clip 166 (FIG. 8A-D) attaches two louvers 600 end to end and deploys a central axle 1662 disposed across a channel that receives the span support hanger 169. This central axle 1662 is then supported at the root of the notch 1661 in the span support hanger 169. The span support hanger(s) 169 is (are) supported in the vertical orientation by a fixed pin disposed in the header 120 between the end caps 123. Negative angle rotation (FIG. 5A) is enabled by the span support hanger 169 by the cut back trapezoid region of the span support hanger defined by the rear edge 165$a$ in the circle portion 801 in FIG. 8A.

It should be appreciated that while center arm pin 1642 and positioning clip pin 1652 are on a common end clip to reduce the number of parts in the assembled device, each can be associated with a separate adjacent end clip 163, and the position of the position clip pin 1652 can be adjusted for each louver 600 in the vertical stack.

While the invention has been described with respect to louvers 600 that remain essentially parallel, the position clips 163 and 166 can be used to introduce an incremental bias angle ($\alpha$ in FIG. 6B) between each adjacent louver 600 in the vertical stack. This variable rotation can be achieved by each louver 600 being varied in position of the positioning pin 1652 from the central arm pin 1642, so that in the most vertical position, the lowest louvers 600 would be the most offset from most vertical upper louver 600'.

By such a bias of rotating each louver 600 a greater degree than the adjacent louver provides the benefit of spreading the re-directed light over a broader angle range on the ceiling 20 so that scattered light 13 illuminates a greater portion of the building interior.

Hence, another preferred embodiment of the end clip 163' (FIG. 9) deploys an adjustable positioning clip pin 1652'. With the positioning pin 1652' offset being adjustable on each pair of edge support members 163', each louver 600 need not be parallel to the adjacent louvers, and the position of each pin 1652' can be adjusted on arm 1651' by movement in slot 1657 by a different amount from the adjacent louvers 600. Alternatively, the positioning clip arm 1651' could be configured with a set screw to be repositioned along the end clips 163' to adjust the position for each louver 600.

Figure 10:
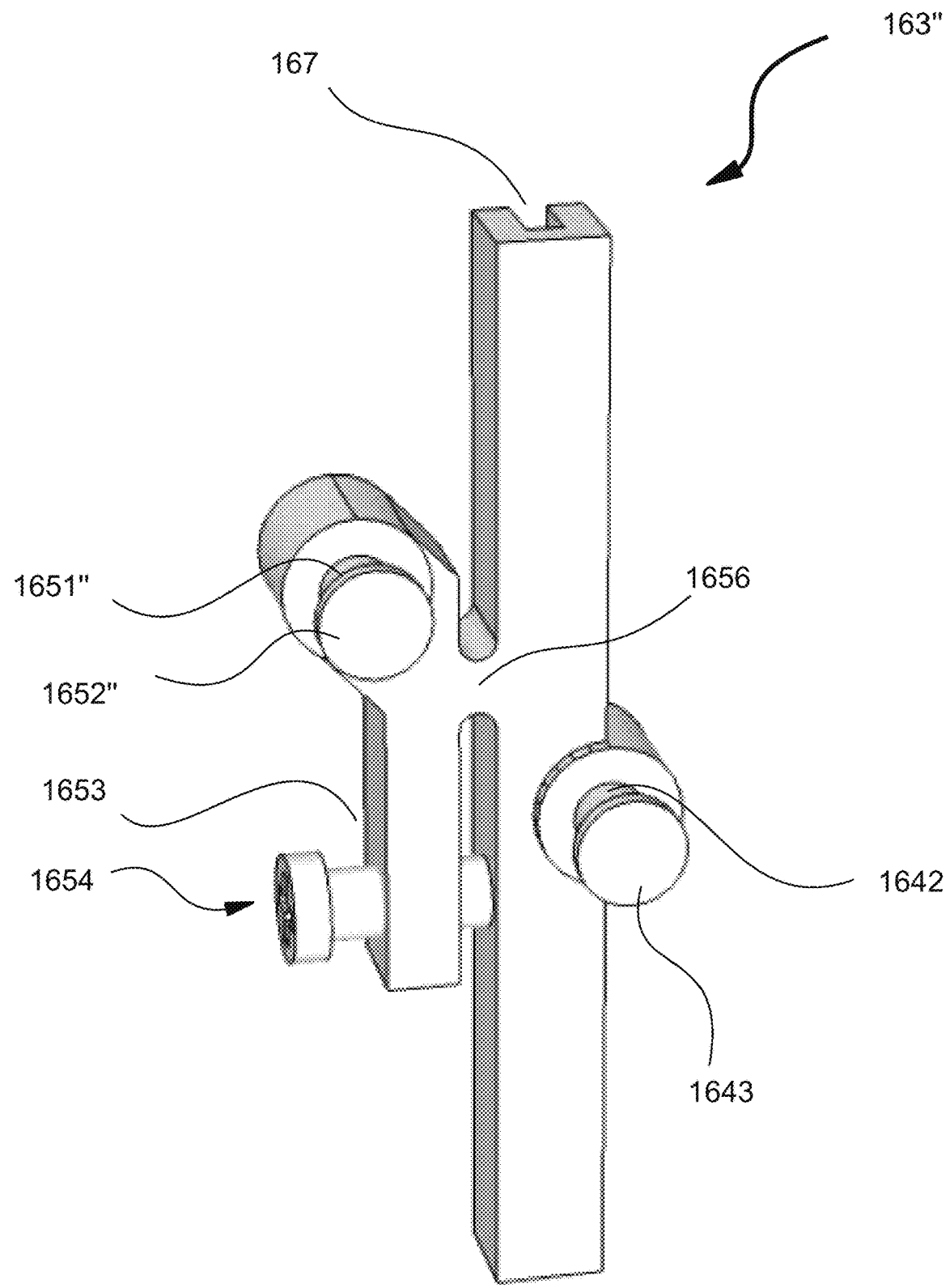
FIG. 10 is a perspective view of another alternative embodiment of the end clip.

FIG. 10 illustrates an alternative end clip 163" that can be deployed to achieve such an incremental bias ($\alpha$ in FIG. 6B)

in each louver 600. The positioning support arm 1651", which has an outward extending positioning clip pin 1652", is on the opposing end of the lever arm portion 1653 from the set screw 1654 so that it extends through a threaded bore in lever arm 1653. The lever arm 1653 is connected to the body of clip 163" by a flexible post 1656. Rotating the set screw 1654 so that it contacts the clip pin body thus rotates the arm 1653 clockwise, moving pin 1651" closer to the face of the louver 600 that sits in the linear channel of the jaw 167. Such a displacement of the pin 1651" provides an incremental bias to each louver 600 in the vertical assembly 160.

Figure 11:
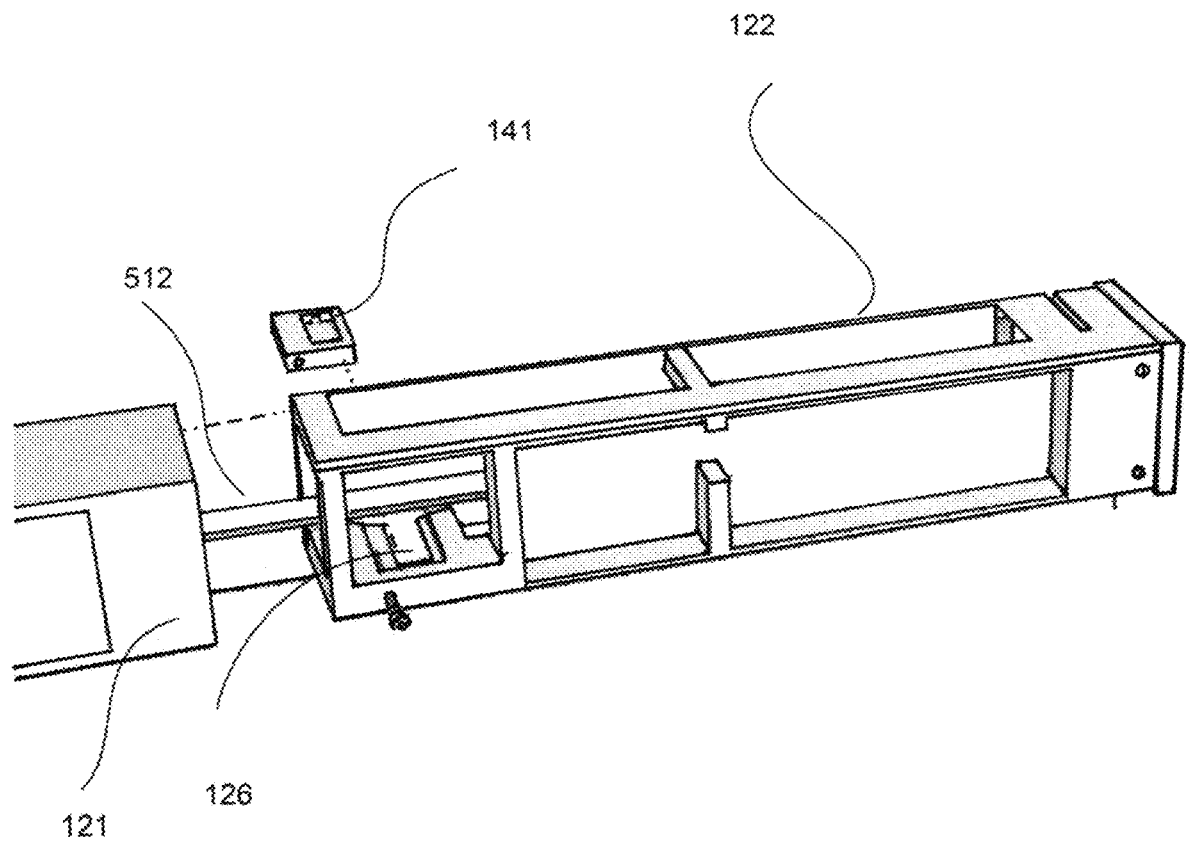
FIG. 11 is a partially unassembled exploded front view of the header module and optical sensor means prior to insertion in the header case

FIG. 11 illustrates a preferred modular construction of the actuation means 500, as being contained in module 122 that slides into the header case 121, and is sealed therein by the opposing end cap 123 that also support the wedge gears 515 that connect the common header shaft 512.

Figure 12:
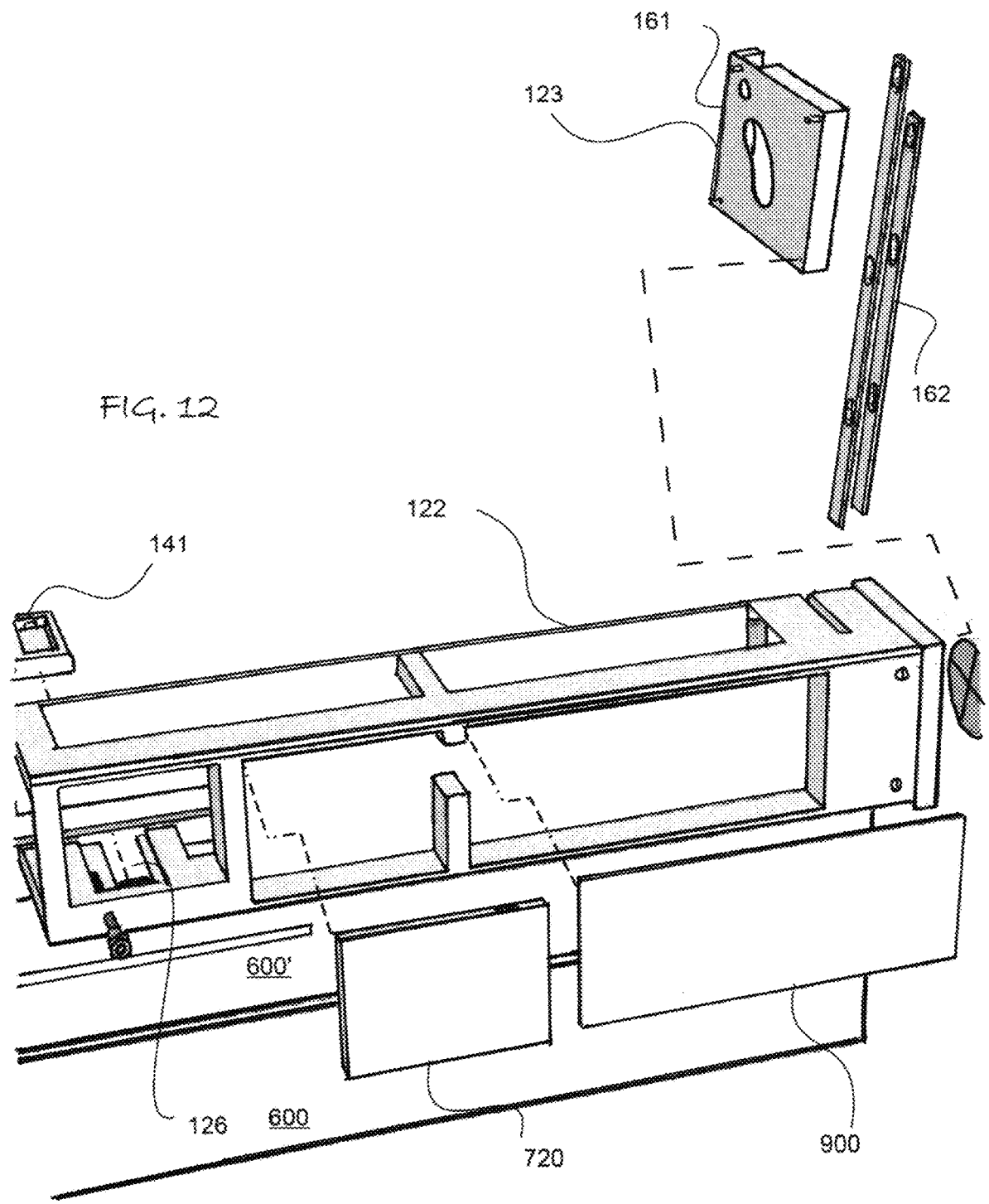
FIG. 12 is an exploded perspective view of the header module to illustrate the placement therein of the PCB of the actuation means and a rechargeable battery.

FIG. 12 is a partially unassembled view of the header 120 and upper louver 600 and optical sensor means 140 prior to the insertion of the header module 122 into the header case 121. The detector array 141, which is preferably on a separate PCB, slides out from a slot 126 in the header module 120 after the module 122 laterally, slides into the header case 121. The header case 121 has a front opening corresponding to the detector array location slot 126. The detector array 141 position is optionally determined by an adjustment screw. Preferably, a spring, located between PCB and the frame, to urge the PCB forward. A slot opening in the bottom of the header module 122 enables sunlight to reach the photodiodes of the detector array 141. The header case 121 has a corresponding slot and opening The controller 520 and related electronic components are on the printed circuit board (PCB) 900 that fits in a mating slot in the front of the header module 122. Once the optical sensor means 140 is inserted in the corresponding slot 126 and wired to the PCB 900, the module 122 then inserted into the elongated rectangular header case 121, and sealed by end cap 123 to complete the header 120 assembly.

FIG. 14 is a flow chart illustrating alternative methods of use of Window Louver Control System 100 using a tracking process 1400. The tracking process 1400 has a sub-process 1401 for setting the tracking conditions for each window installed.

While each window louver assembly 100 can have a dedicated user interface to input and/or determine the tracking parameters set in sub-process 1401, it is preferable that the controller 510 also include a wireless communication module 521 or IR signal receiving module 521' to receive the tracking parameters transmitted in step 1460.

Steps 1410 to 1455 allow the selection of the tracking parameters for a single window. To the extent that multiple Window Louver Control Systems 100 in a single structure or related structure have common orientations, and are provided to illuminate a common area or other region of the structure, they can be grouped to receive the same parameter sets in step 1460 by step 1456 in which a user can commonly set the parameters for multiple windows to be the same, or at least partially the same as any other window previously set or stored in the controller memory.

The window orientation (with respect to the compass coordinates) is determined or set in step 1410 to enable the tracking algorithm to account for solar elevation and/or azimuthal angle change with the day and season.

The installation latitude, and preferably longitude and/or GMT offset are selected or determined in step 1420. The current date and time are determined or set in step 1430.

In step 1440 the tracking time period is are set, which is generally day light hours, but can vary if the window position is habitually shaded by external objects at certain times of the day.

In step 1450 the louver orientation for non-tracking hours is set. It is optionally that the same orientation when tracking would begin at the start of the next day, or the vertical position of FIG. 5B for maximum see-through visibility. It is not necessary to attempt solar tracking at night and when a building is vacant, such as weekends and holidays in business establishments. Hence, in option step 1450, the louver orientation in non-tracking hours is selected, which can be set by the angle from vertical orientation (FIG. 5B) placing the louvers 600 vertical for maximum see through visibility.

In step 1451 and/or 1452 the tracking mode is selected, which in step 1451 would optionally be to re-direct the light via louver rotation to the same ceiling location an optionally selected ceiling location 20a, to the extent it is permitted by the current solar elevation and azimuthal angle. Alternatively, the solar tracking can be set in step 1452 for maximum efficiency, meaning the maximum utilization of available daylight, without regard to exactly where on the interior ceiling 15 it will be re-directed.

In the max efficiency scenario, the louvers 600 are tilted to their no leak or double internal reflection position, which is an effective sun elevation of ~42 degrees for a 2:1 aspect ratio internal optical element, as defined by the reflective surfaces In the constant re-direction strategy, the louvers are tilted to project the re-directed sun in one constant position within the room. It should be appreciated that although constant re-direction is less efficient, either approach can be used for any window in different rooms or dwelling portions, for different times of the day, including alternating with adjacent window installations.

Another aspect of the process 1500 is that the microprocessor/controller 520 can store or access a data medium at the time of installation to determine the orientation of the window, the latitude and longitude of the installation, and the current time and date. The microprocessor could then calculate the optimal orientation as a function of day and time to make nearly continuous adjustment. A preferred way to provide this data is via a smart phone that also determines the window orientation from the built in compass. The smart phone would be used to determine the window orientation after installation of the header in the window frame. The smart phone can also be use to enter all parameters that are needed to uniquely determine the solar elevation as well as daylight hours in which tracking would improve interior day-lighting, and reduce glare to occupants looking directly at the window.

Hence, the device 100 and/or actuation means 500 or controller 520 also includes a wireless communications means, such as a Bluetooth™ 521' or Wi-Fi module 521', or IR detector 521" to receive the above parameters in Step 1460 at the time of installation, such as from an IR remote control device. It would also be advantageous to provide in such communication of parameters in step 1460 with a smart phone any alternative conditions, as for example, instructions for the louver position at night or on cloudy, overcast or rainy days (step 1455)

An orientation of the louvers 600 can also be selected for when the tracking is not desired in set up step 1450.

Steps 1410 and 1440 relate to a set up process, which can optionally use the controller 520 to derive or calculate the solar elevation and azimuthal angles in step 1490, before rotating the louvers 600 in step 1495.

To the extend it is outside of working or day light hours a user in step 1450 would select this time range and the preferred louver orientation for such a time range.

It should be appreciated that any tracking or non-tracking time range can be sub-divided into multiple ranges, each with a designated louver orientation or method of determining an optimal louver orientation. For example, as shown in the example in FIG. 5A, it would be desirable when the sun is very close to the horizon 9 early morning and late afternoon) to negatively tilt the louvers 600. In contrast FIG. 5B shown the vertical orientation of the louvers for maximum see through visibility from the interior outward. FIG. C shows a preferred orientation when the sun is tracked.

Hence, in optional step 1455 a user can select or determine if the louvers should be set to a particular orientation when the day is overcast, which can be updated regularly from weather forecast data transmitted by a smart phone, or by real time measurement of light intensity from the PV cells 710 by the controller 520.

While various prismatic structure are known for light re-direction when applied to glazing, or used on tiltable louvers, it should be understood that the more preferred embodiment eliminate secondary issues with such daylight structure, and in particular reduce the glare that occurs in prismatic structures while achieving see-through visibility in both the louvers and any horizontal gap between louvers.

Notably, to the extent that louvers can be designed to re-direct light inward, rather than reflect it is as in U.S. Pat. No. 4,773,733, the louvers structure improves several negative secondary effects of prior art light re-directing structures and introduces additional positive benefits.

For example, in many installations, the louvers 600 may be largely vertical, so there is relatively little vertical gap between tilted louvers 600 as they track the sun. Hence, for an observer inside a building to "see-through" the louver array to the outside of the building, the louvers must be transparent to horizontal light rays in the vertical orientation FIG. 2 and FIG. 3. Since the louvers 600 are primarily vertical in the day-lighting or light re-directing mode, the edges of the louvers can introduce significant glare as they form vertical gaps or allow some of the intense sun-light to leak or escape at these edges. Accordingly, in the more preferred modes of the invention those louvers 600 have blackened edges. These negative effects are more fully described in commonly owned US Pat. Applications with common priority documents to this application, which have been incorporated herein by reference.

In an alternative embodiment the solar tracking optical element and linear detector array need not be deployed to track solar elevation and angle. As it can be uniquely calculated from the time, date, window orientation, longitude and latitude.

Figure 15:
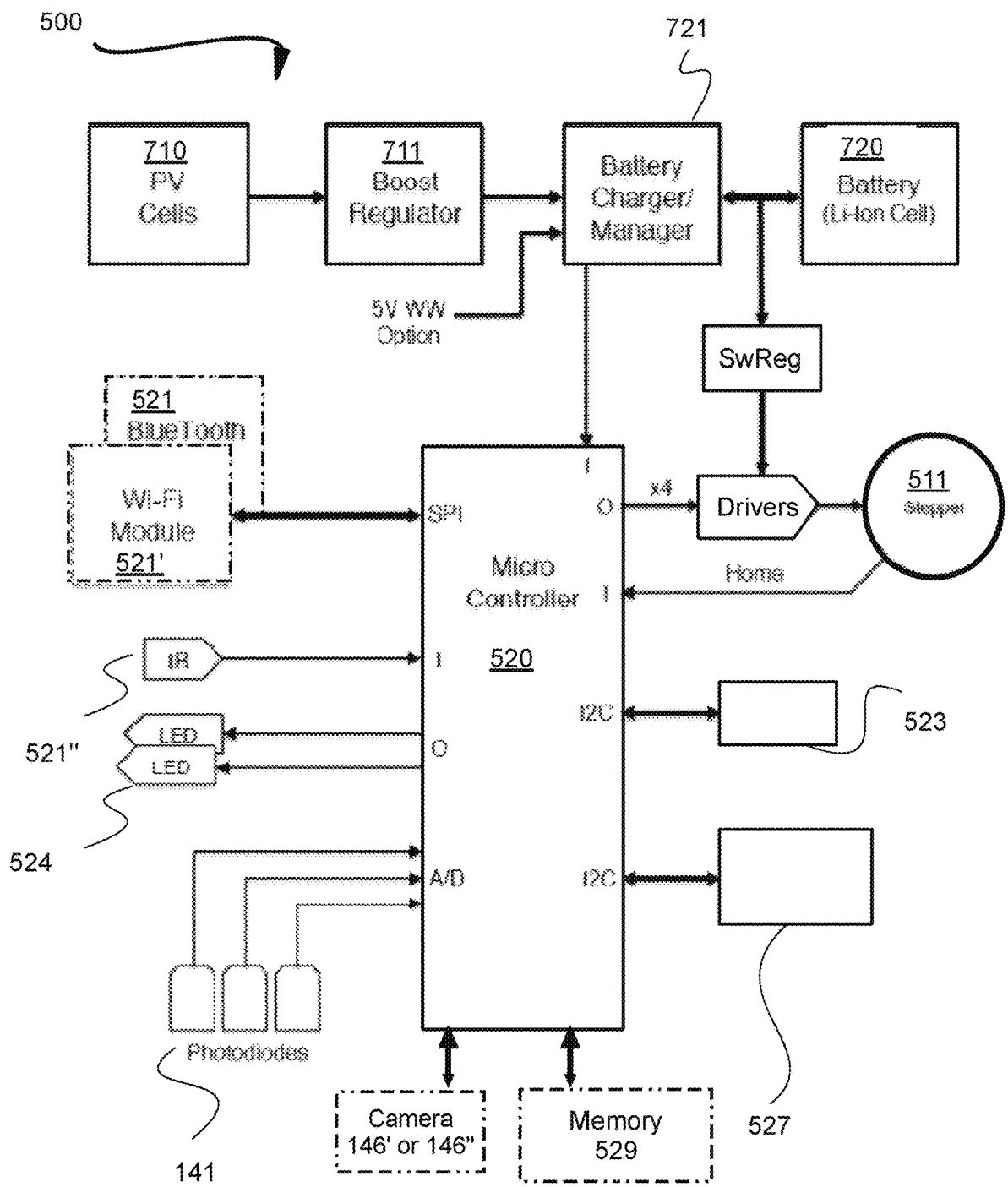
FIG. 15 is a more detailed schematic block diagram of an actuator means including the optional sun-tracking system electronics and electro-mechanical components.

The actuation means 500 in the block diagram of FIG. 15 schematically illustrates the preferred and optional components connected to a microprocessor or controller 520 that is energized by battery 720 via charger manager 721 that received the proper voltage from boost regulator 711. The boost regulator 711 transform the output of the PV cells 710 on the front of the header 120 to the proper input voltage for the charger manager 721. The microcontroller 520 optionally deploys connected or removable memory 529, to store the set up parameters from process 1401 in FIG. 14. The real time clock 523 provides the controller 520 with the time and optionally date for step 14.70 in FIG. 14. Optionally, one of the Bluetooth™ receiver 521, Wi-Fi receiver 521' or IR detectors 521" receive the parameters in step 1460 in FIG. 14. Then in step 1490, the controller 520 determines the solar elevation and azimuth optionally via actual measurements it receives by calculation based on the output of the photodiode or comparable photo-detector array 141, and optionally, the real time PV cell 710 output for determining cloudy or overcast conditions in step 1480. Then in step 1495 the microcontroller 520 then activates the stepper motor 511 via the associated drivers in accordance with calculation of the louver orientation in step 1490 to rotate the louvers in step 1495 or 1485. Step 1470 is repeated until the current time/date is no longer in the tracking time period, in which case in step 1475 the controller 520 is operative to activate the actuator means and rotate the louvers in step 1475 to the position selected in step 1450

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

For example, it should be appreciated that while the preferred louver actuation and drive means are particularly suited to light re-directing louvers that move frequently, they can also be deployed with non-planar louvers, opaque or translucent or diffusing louvers to better control the admission of solar sun, light and heat or achieve inhabitant privacy according to the time of day and season, climate, and user needs, preferably via the set up process of FIG. 14.

In an alternative embodiment of the invention, at least a portion of 2 or more louvers can be used as collimators 136 to modulate the light that impinges on a PV cell 710 set behind them, which provides a sensor means 140. When the louvers 600 are oriented to match the sun elevation the PV cell 710 electrical outputs will be maximized; this louver orientation can then be used to determine the solar elevation and at least another portion of the louver array can be readjusted to optimize the daylight redirection effect for this solar elevation. A small portion of the louvers that are intended for daylight re-direction can be blackened to make them non-transmitting to avoid glare from edge reflections, with either paint or stickers. It should be appreciated the opaque end clip 163 also precludes glare from side edge transmission. This portion of the louvers need only be the width of the PV cell 710 used as the detector. The PV cell 710 can optionally be transparent to preclude the visual distraction of the back of it being suspended from the header. Alternatively, a mirror can be disposed behind this blackened louver portion to re-direct sunlight to a PV cell 710 that faces downward from the bottom of the louver, as well as out in front of the header as shown in FIG. 3.

Alternatively, the front edge of the header 120 can be covered by the uppermost louvers 600 in the array, and a PV cell 710 or cells cover this front edge. Alternatively, the header 120 may have one or more sets of such sensing louvers that are separately tiltable and disposed above the primary louvers, which are rotated with a separate servo-control or motor, or geared to rotate with the larger suspended louvers. The header 120 may include a set of both horizontal and vertical disposed sensing louvers with the same of separate light detectors to measure the elevation and azimuth of the sun, and adjust the primary louvers accordingly. When these sensing louvers are place in the front of the header 120 directly facing the glazing, they will not be in the shadow of the header, and not distract from the view outward from the interior of the room.

Alternatively to provide clean interior lines, the uppermost louvers can be at least partially blackened and the PV cell or PV Cell 710 array extend from the header for the entire width of the header. These upper most louvers can be narrower and more closely spaced than the other louvers used for light re-directing to reduce the height of the PV cell, and hence provide a greater percentage of the available glazing array for sun light to be re-directed by the other louvers.

It should be appreciated that in these embodiments the PV cell 710 (s) serve as the detectors and a portion of the louvers or the louvers that otherwise block the PV cell(s) serve as the optical element. This configuration avoids a detector array and placing any discrete optical element on the edge of a louver that is otherwise acts to redirect light.

Figure 2:
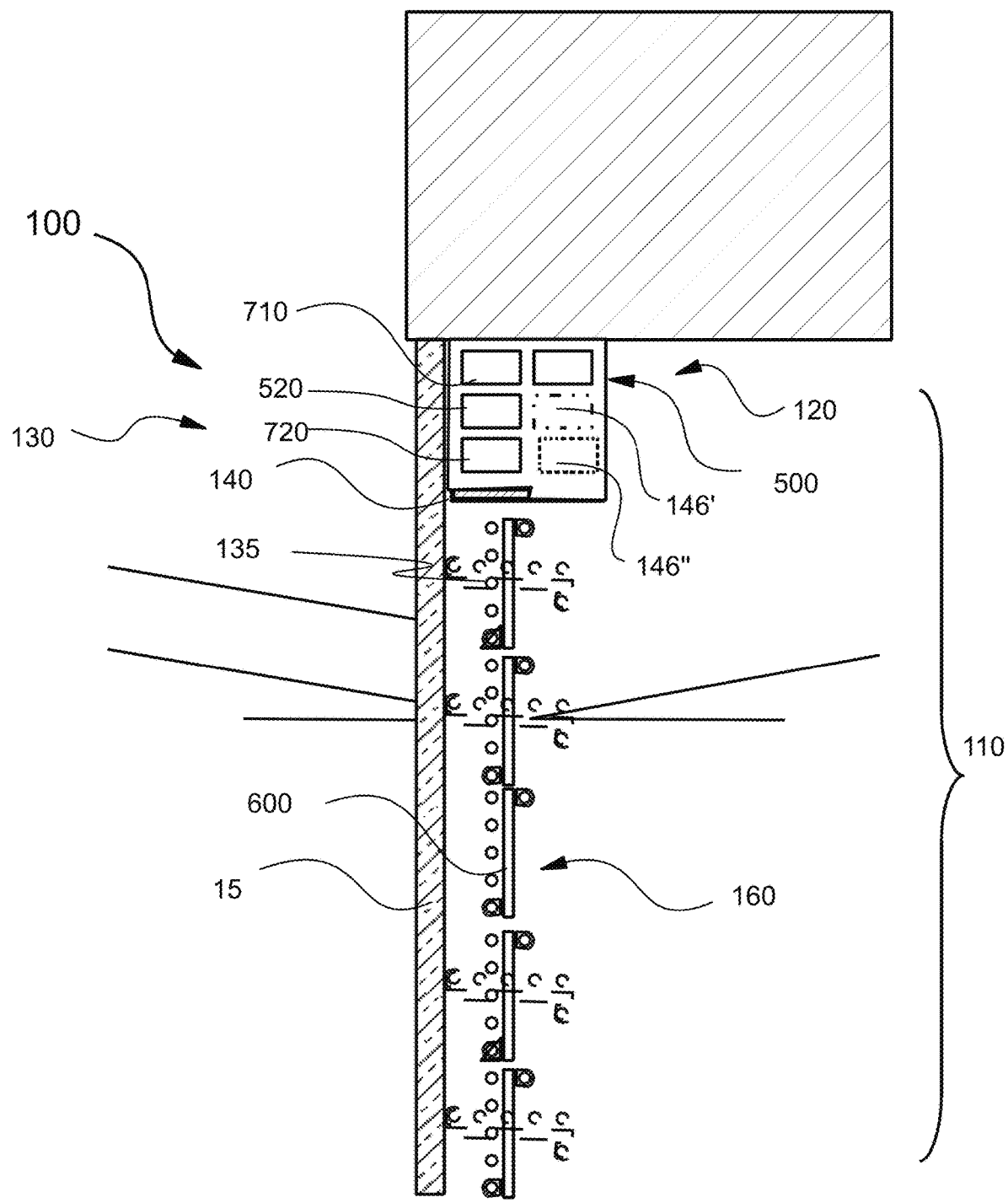
FIG. 2 is a cross-sectional elevation of an embodiment of the inventive system installed in front of exterior glazing.

In an alternative embodiment also illustrated in FIG. 2, a two-dimensional CCD array, or other camera type imaging detector, 146' is optionally deployed as a detector means to directly image the sun by looking outward from the window over a wide field of view. Alternatively, the position of the sun can be inferred from an inward facing camera 146' pointed at the ceiling 20 to measure illuminated portion 20a and adjust the louver orientation according to the teachings of this application. The center of portion 20a can be used to calculated solar elevation. FIG. 15 illustrates both optional camera detectors 146' and 146" in signal communication with the controller 520.

It should be appreciated that the invention also anticipates the use of multiple optical elements and detectors, such as one pair dedicated to measuring the solar elevation and another pair dedicated to measuring the solar azimuth angle.

Nothing precludes the combination of features, aspects or elements described in one embodiment, from those being used or combined with others in different embodiments of the invention.

We claim:

1. A louver assembly, comprising:
   a) a tiltable array of generally parallel louvers, wherein the louvers are for light re-directing and are configured to be tilted to re-direct sunlight into an interior space, each of said louvers having a center axis and each of said louvers generally extends in a plane between opposing ends thereof,
   b) a means to determine an azimuthal and elevational direction of the sun,
   c) an actuator means for tilting the louvers,
   d) a header for supporting the array of generally parallel louvers and that includes the actuator means to tilt the generally parallel louvers,
   e) wherein the actuator means is operative to tilt each of said louvers from a negative tilt angle to a positive tilt angle by passing the plane of each of said louvers through a vertical orientation, wherein each of said louvers is supported to be tilted by pivoting approximately about the center axis and the actuator means is operative to tilt each of said louvers about a tilt axis that is parallel to and proximately spaced apart from the center axis of each of said louvers by a vertically moving positioning bar, wherein the positioning bar engages each of said louvers at a position distal from the tilt axis.

2. The louver assembly of claim 1 wherein a plurality of the louvers of the array of louvers, are transparent to horizontal light rays when each of the louvers of said plurality are of the louvers is disposed in the vertical orientation.

3. The louver assembly of claim 1 further comprising one or more photovoltaic cells to power the actuator means.

4. The louver assembly of claim 3 wherein the actuator means further comprises a battery that stores energy from the one or more photovoltaic cells and the battery is not operative to power the actuator means when the battery has a charge state that is below a predetermined level.

5. The louver assembly of claim 1 wherein the means to determine the azimuthal and elevational direction of the sun utilizes at least the date, the time, and a louver array compass orientation and location.

6. The louver assembly of claim 5 wherein the means to determine the azimuthal and elevational direction of the sun is in wireless communication with a computing device which provides a means for determining the compass orientation of the louver array.

7. The louver assembly of claim 1 wherein the means to determine the azimuthal and elevational direction of the sun is a reflector disposed on an upper louver in the array of louvers, wherein the upper louver is tilted to maintain an image of the solar disk on a detector array supported by the header.

8. The louver assembly of claim 1 wherein the actuator means is operative to tilt the louvers in response to a determination of the azimuthal and elevational direction of the sun.

9. The louver assembly of claim 8 wherein the actuator means is further operative to tilt the louvers to redirect sunlight into the interior space at a constant angle for at least a portion of a day.

10. The louver assembly of claim 1 wherein the array of louvers has a first louver and a second louver immediately adjacent to the first louver in which the plane of the first louver is not parallel to the plane of the second louver.

11. The louver assembly of claim 10 wherein each louver of the array of louvers includes a pair of support clips which receive and support the opposing ends thereof, said support clips being operative to dispose the plane of each of said louvers at a predetermined bias angle with respect to at least another one of said louvers.

12. The louver assembly of claim 1 wherein each of the louvers of the array of louvers has a pair of opposing edges, wherein for each of said louvers at least one of said opposing edges is covered by matter that does not transmit light.

13. A louver assembly, comprising:
   a) a tiltable array of generally parallel louvers, wherein the louvers are for light re-directing and are configured to be tilted to re-direct sunlight into an interior space, each of said louvers having a center axis and each of said louvers generally extends in a plane between opposing ends thereof,
   b) a means to determine an azimuthal and elevational direction of the sun,
   c) an actuator means for tilting the louvers,
   d) a header for supporting the array of generally parallel louvers that includes the actuator means to tilt the generally parallel louvers and,
   e) wherein the actuator means is operative to tilt each of said louvers from a negative tilt angle to a positive tilt angle with respect to a vertical plane by passing the plane of each of said louvers through a vertical orientation,
   wherein each of said louvers includes a pair of support clips which receive and support the opposing ends thereof,
   f) a vertically suspended support bar that is connected to a tilt axis of each of said louvers,
   g) a positioning bar spaced apart from the vertically suspended support bar, wherein the positioning bar engages a portion of the support clips that is different than a portion of the support clips the vertically suspended support bar engages so that a majority of the mass of each of said louvers is supported by the vertically suspended support bar, wherein a vertical movement of the positioning bar is operative to tilt each of said louvers.

14. The louver assembly of claim 13 wherein the actuator means includes a wedge gear that is operative to raise and lower the positioning bar.

15. A louver assembly, comprising:
a) a tiltable array of louvers, wherein the louvers are for light re-directing and are configured to be tilted to re-direct sunlight into an interior space, each of said louvers having a center axis and each of said louvers generally extends in a plane between opposing ends thereof,
c) an actuator means for tilting each of the louvers,
d) a header for supporting the array of louvers and that includes the actuator means to tilt the louvers,
e) wherein the actuator means is operative to tilt a plurality of said louvers from a negative tilt angle to a positive tilt angle by passing the plane of each of said louvers in the plurality of said louvers through a vertical orientation, and
wherein the plurality of said louvers are supported at the opposing ends and are pivotable approximately about a respective one of the center axes, and the actuator means is operative to tilt each of said louvers in the plurality of said louvers about a tilt axis that is parallel to and spaced apart from the center axis thereof by a vertically moving positioning bar, wherein the vertically moving positioning bar is operative to engage one of the opposing ends of each of said louvers in the plurality of said louvers at a position distal from the center axis and the tilt axis.

16. The louver assembly of claim 15 wherein each of said louvers in the plurality of said louvers includes a pair of support clips which receive and support the opposing ends thereof, and the louver assembly further comprising a vertically suspended support bar which supports said louvers and is spaced apart from the vertically moving positioning bar, wherein the positioning bar engages a portion of the support clips which is different from a portion of the support clips the vertically suspended support bar engages so that a majority of the mass of the louvers in the plurality of said louvers is supported by the vertically suspended support bar.

17. The louver assembly of claim 16 wherein the actuator means includes a wedge gear that is operative to raise and lower the positioning bar.

* * * * *